United States Patent
Crudgington et al.

(12) 
(10) Patent No.: US 6,305,257 B2
(45) Date of Patent: *Oct. 23, 2001

(54) MULTI-SPINDLE CNC LATHE

(75) Inventors: John G. Crudgington; Graham J. Crudgington, both of Keller, TX (US)

(73) Assignee: Crudgington Machine Tools, Inc., Ft. Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/848,477

(22) Filed: May 3, 2001

Related U.S. Application Data

(63) Continuation of application No. 09/740,360, filed on Dec. 19, 2000, which is a continuation of application No. 09/557,279, filed on Apr. 24, 2000, now Pat. No. 6,164,173, which is a continuation of application No. 09/283,595, filed on Apr. 1, 1999, now abandoned, which is a continuation of application No. 09/044,353, filed on Mar. 19, 1998, now abandoned, which is a continuation of application No. 08/869,047, filed on Jun. 4, 1997, now Pat. No. 5,918,514, which is a continuation of application No. 08/514,734, filed on Aug. 14, 1995, now Pat. No. 5,676,030.

(51) Int. Cl.$^7$ ............................. B23B 1/00; B23B 9/00
(52) U.S. Cl. ................................. 82/1.11; 82/118
(58) Field of Search ................ 82/1.11, 46, 118, 82/119, 120, 121, 129, 132, 133, 134, 136, 138, 159

(56) References Cited

U.S. PATENT DOCUMENTS

| | | | |
|---|---|---|---|
| 5,152,201 | * 10/1992 | Izawa | 82/1.11 |
| 5,490,307 | * 2/1996 | Link | 29/27 C |
| 5,904,082 | * 5/1999 | Link et al. | 82/129 |
| 6,173,630 | * 1/2001 | Wu | 82/129 |

FOREIGN PATENT DOCUMENTS 1565-587-A * 5/1990 (SU) .................................... 82/120

* cited by examiner

*Primary Examiner*—Henry Tsai
(74) *Attorney, Agent, or Firm*—Michael A. O'Neil

(57) ABSTRACT

A multi-spindle CNC lathe comprises a frame assembly mounted on a base and including spaced apart, rigidly interconnected subframes defining spaced, parallel alignment surfaces. A plurality of spindles each includes a collet for rotating a stock about a spindle axis. An indexing mechanism positions the spindles in alignment with stations located at equally spaced intervals about a central axis. Internal tool slides mounted on the alignment surface of one of the subframes each comprise a servo mechanism for advancing and retracting a cutting tool along a work station axis. External tool slides mounted on the alignment surface of the other subframe each comprise a first servo mechanism for advancing and retracting a cutting tool toward and away from the work station axis and a second servo mechanism for selectively moving the cutting tool back and forth along a path extending parallel to the work station axis.

1 Claim, 26 Drawing Sheets

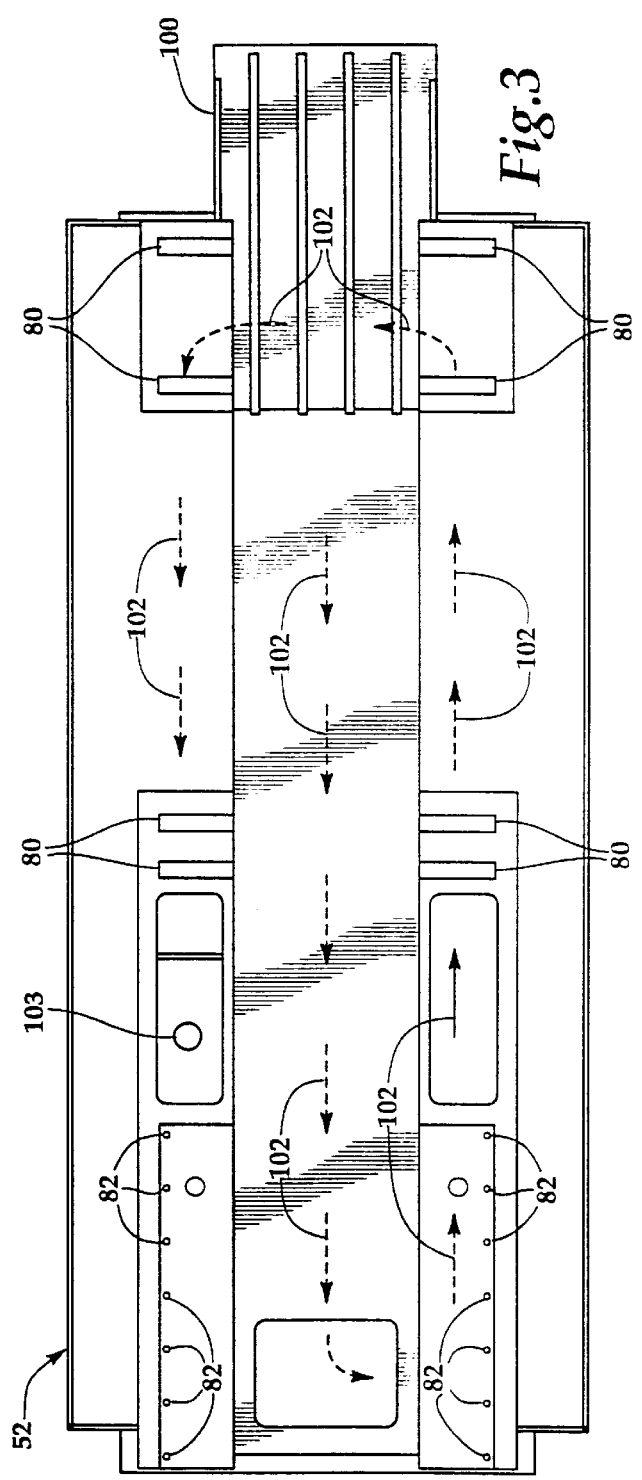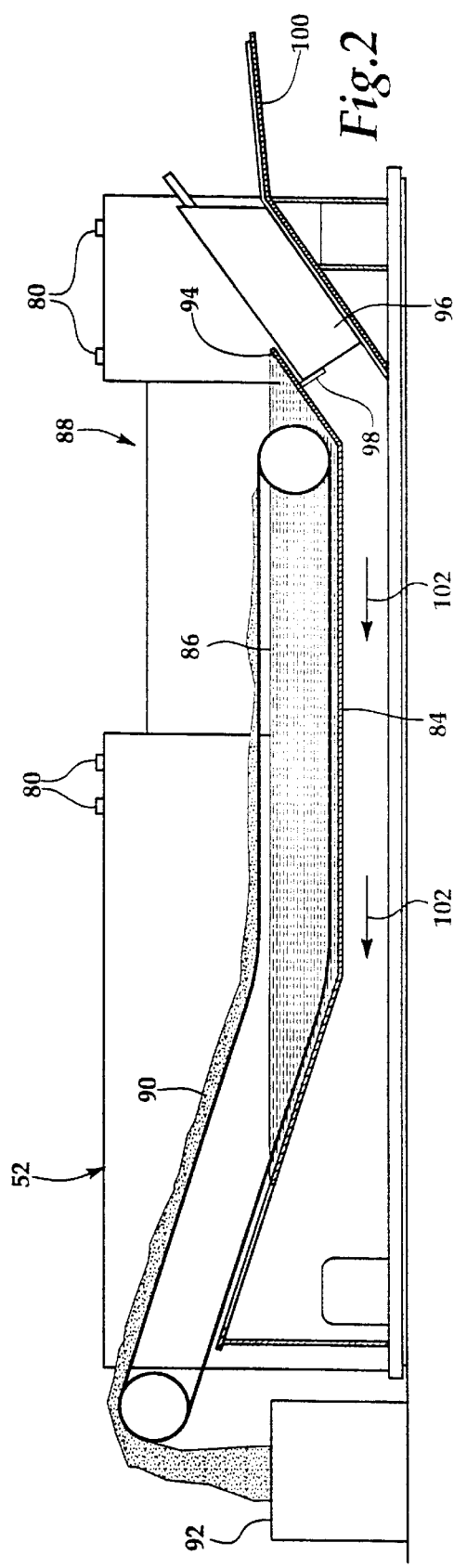

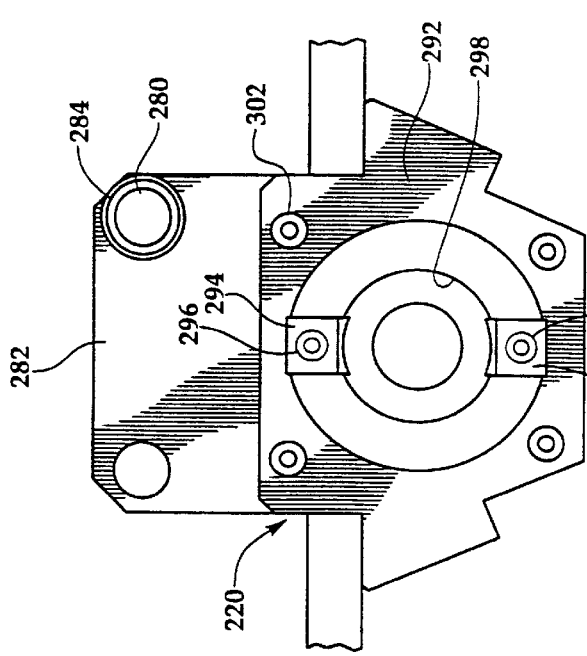
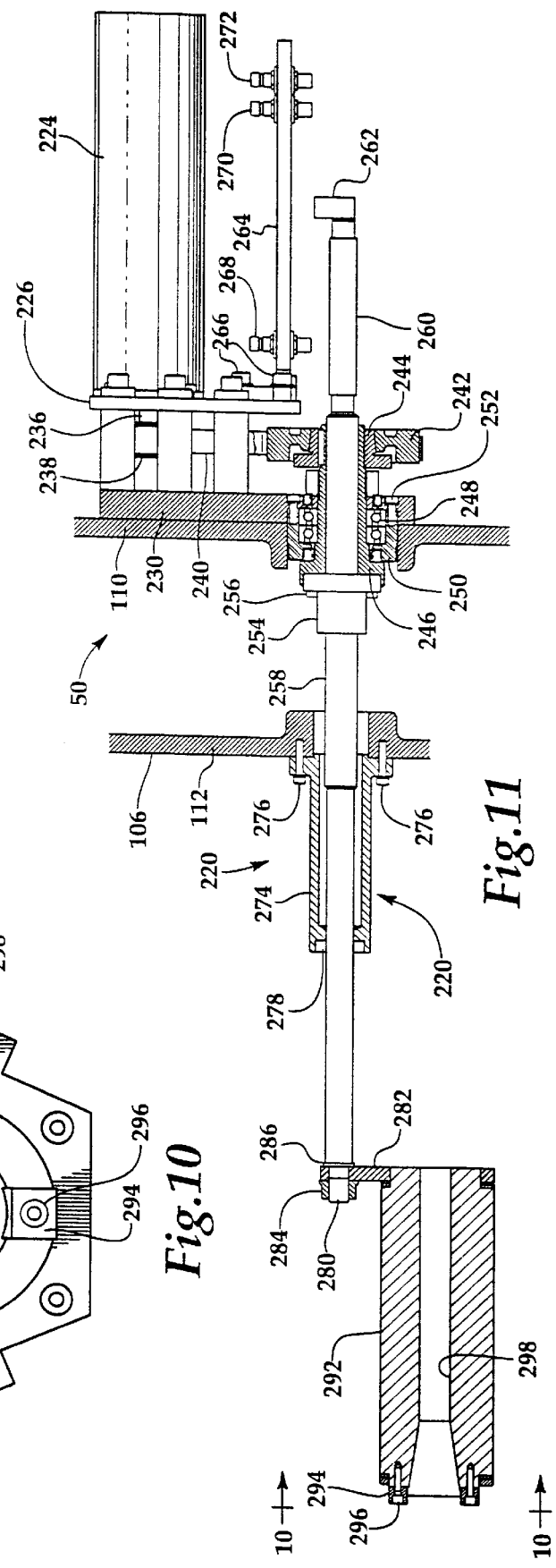
Fig.10
Fig.11

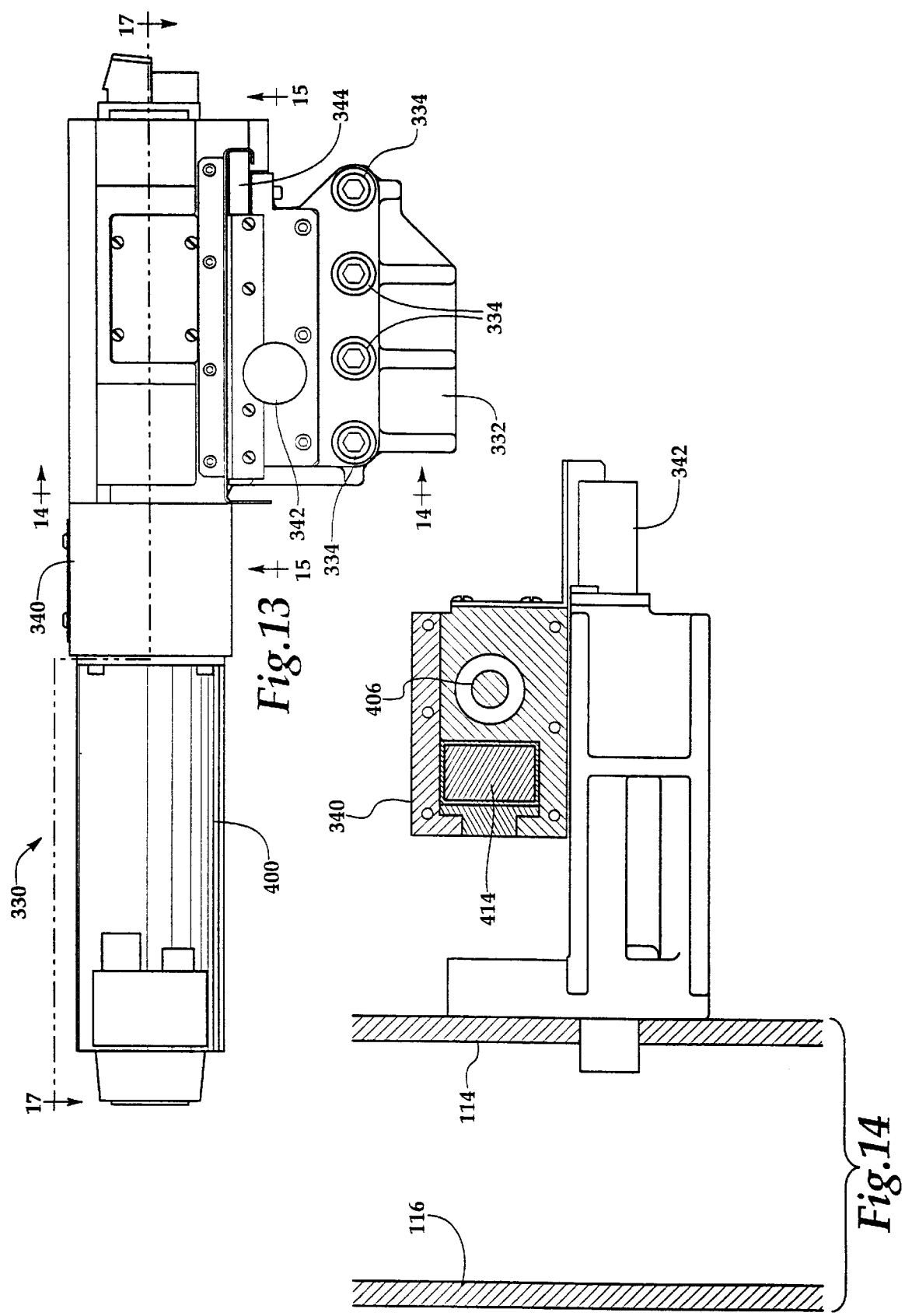

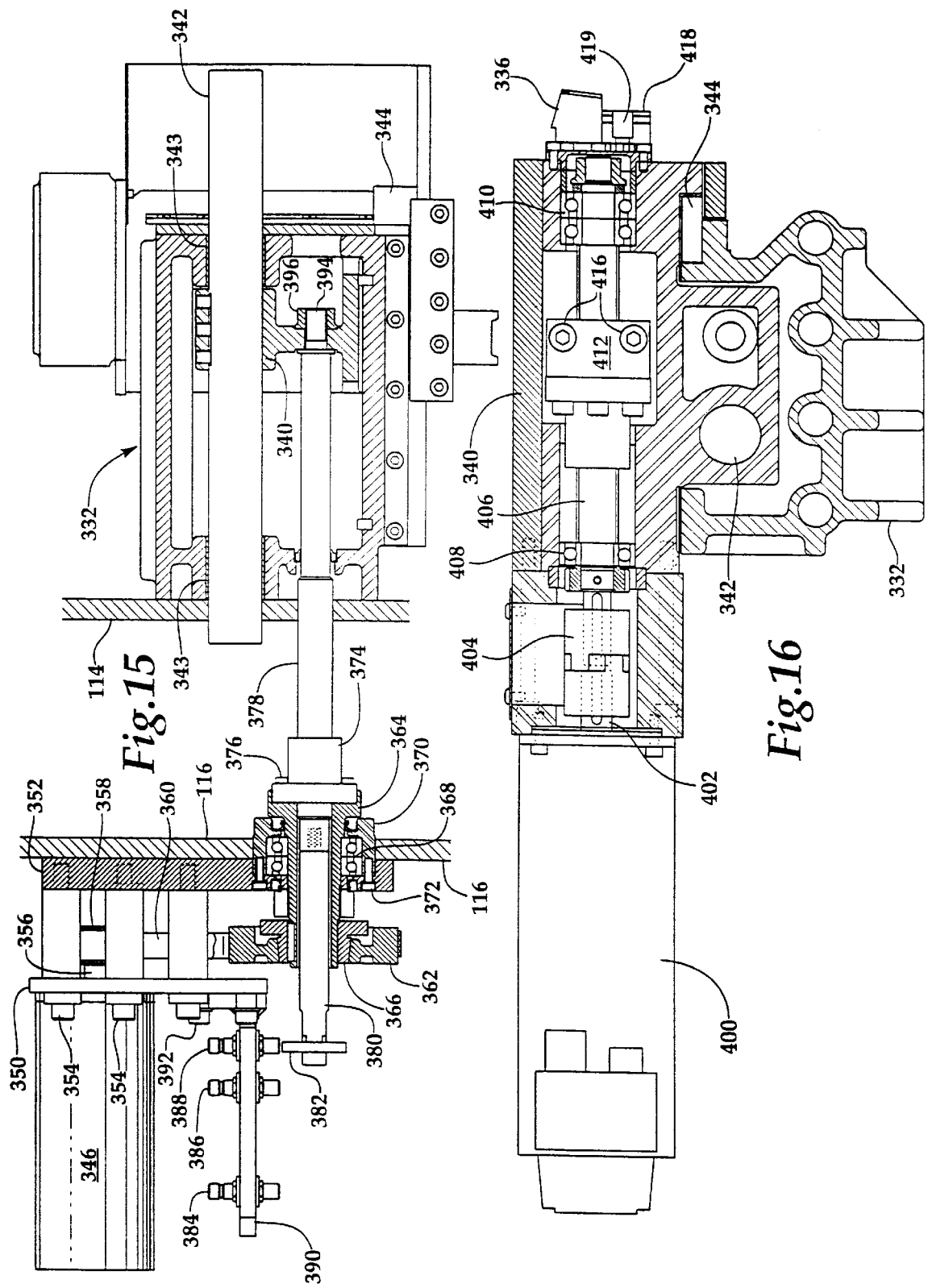

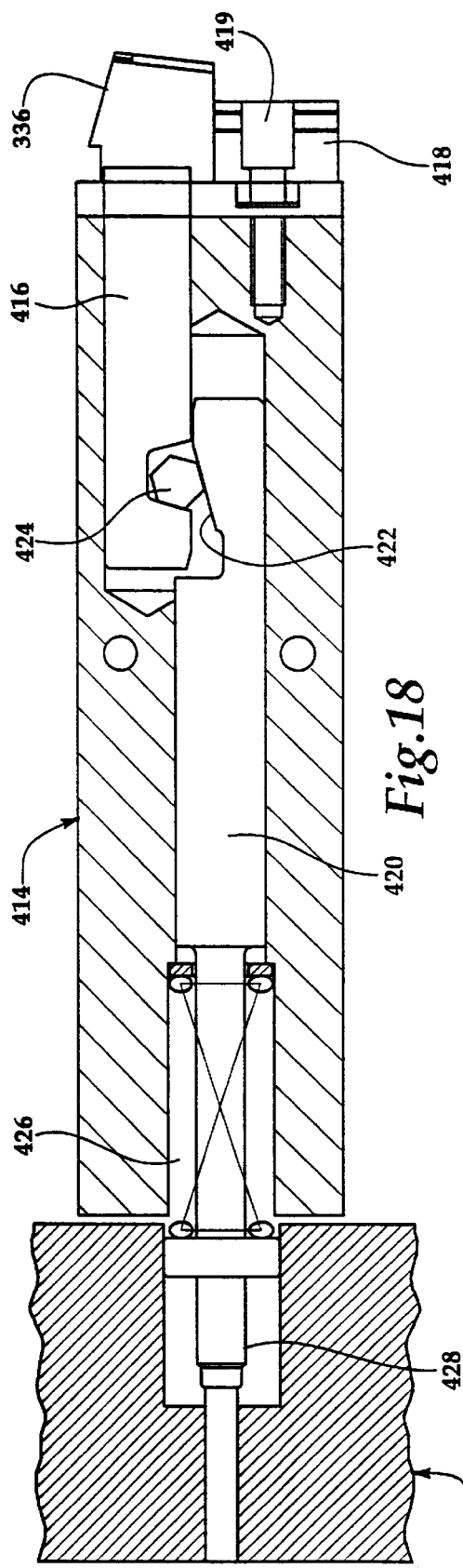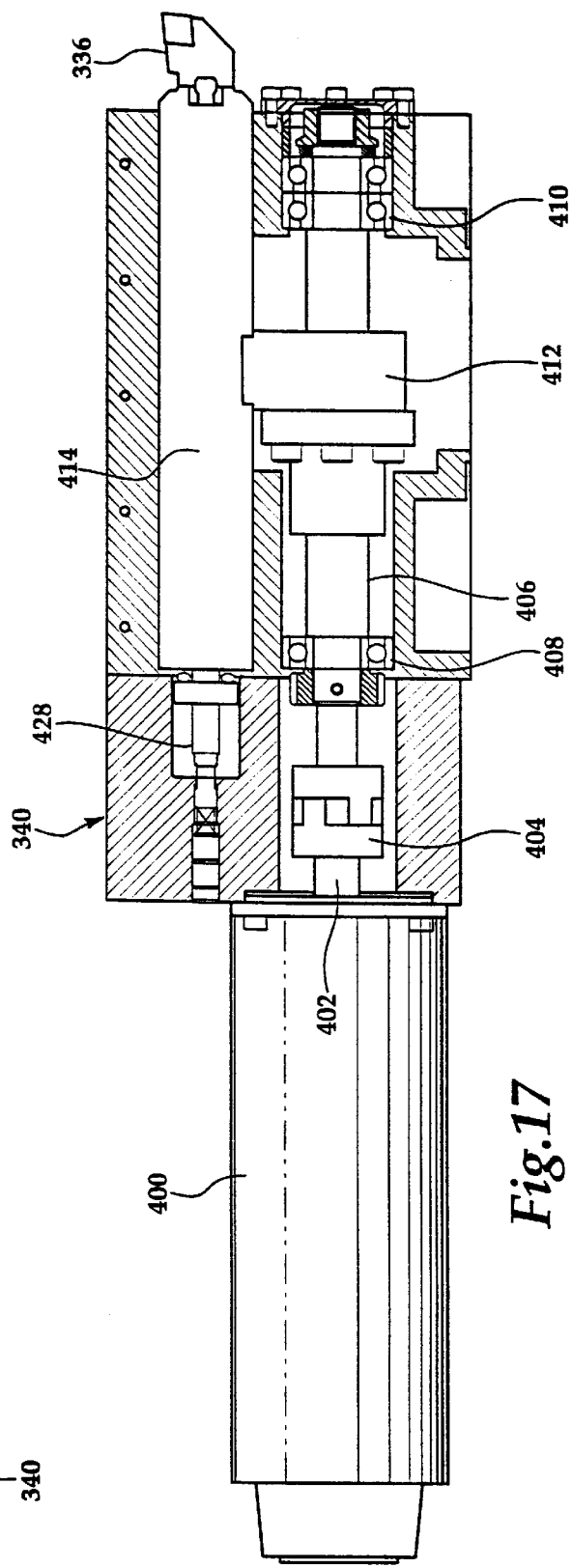

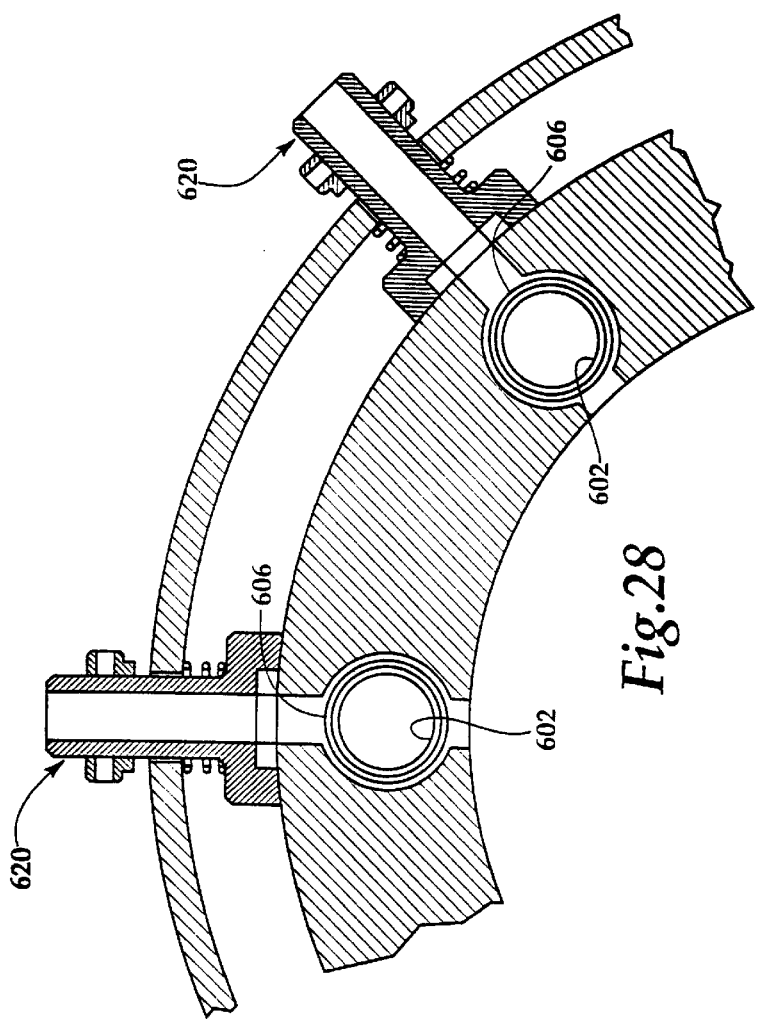
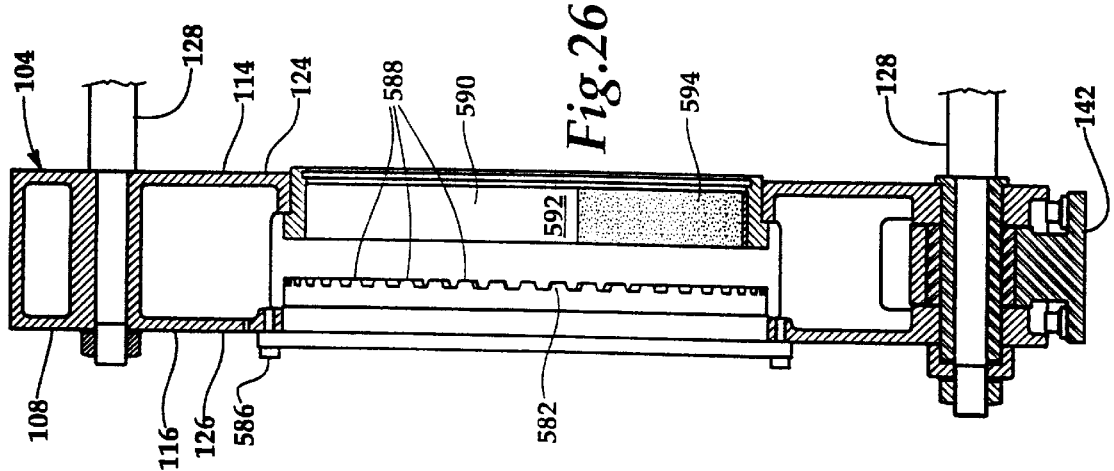

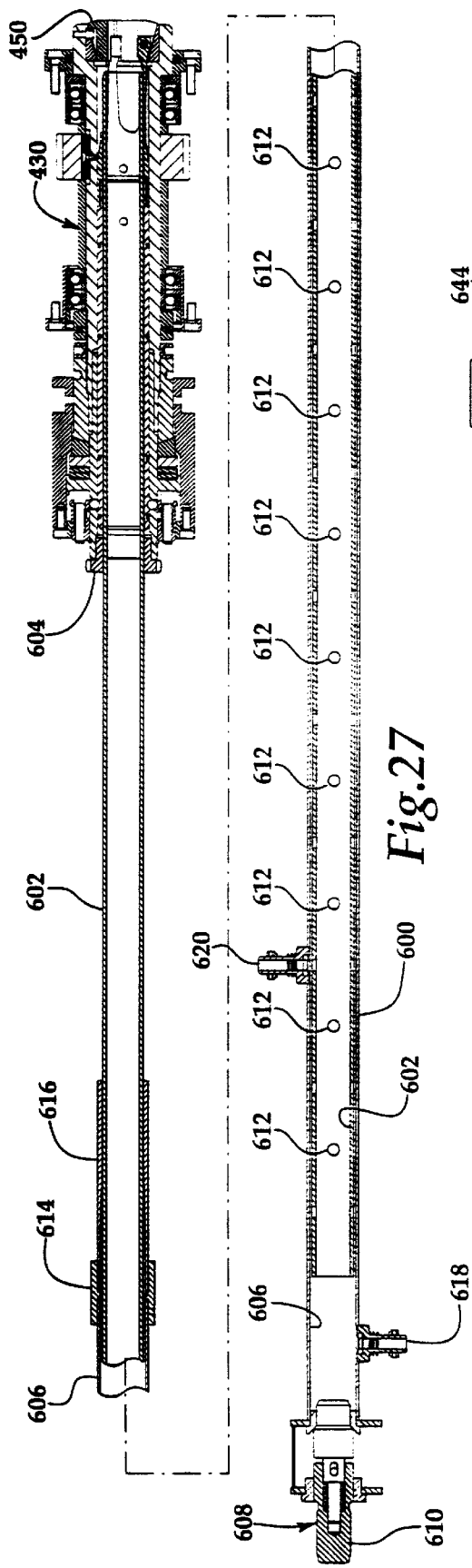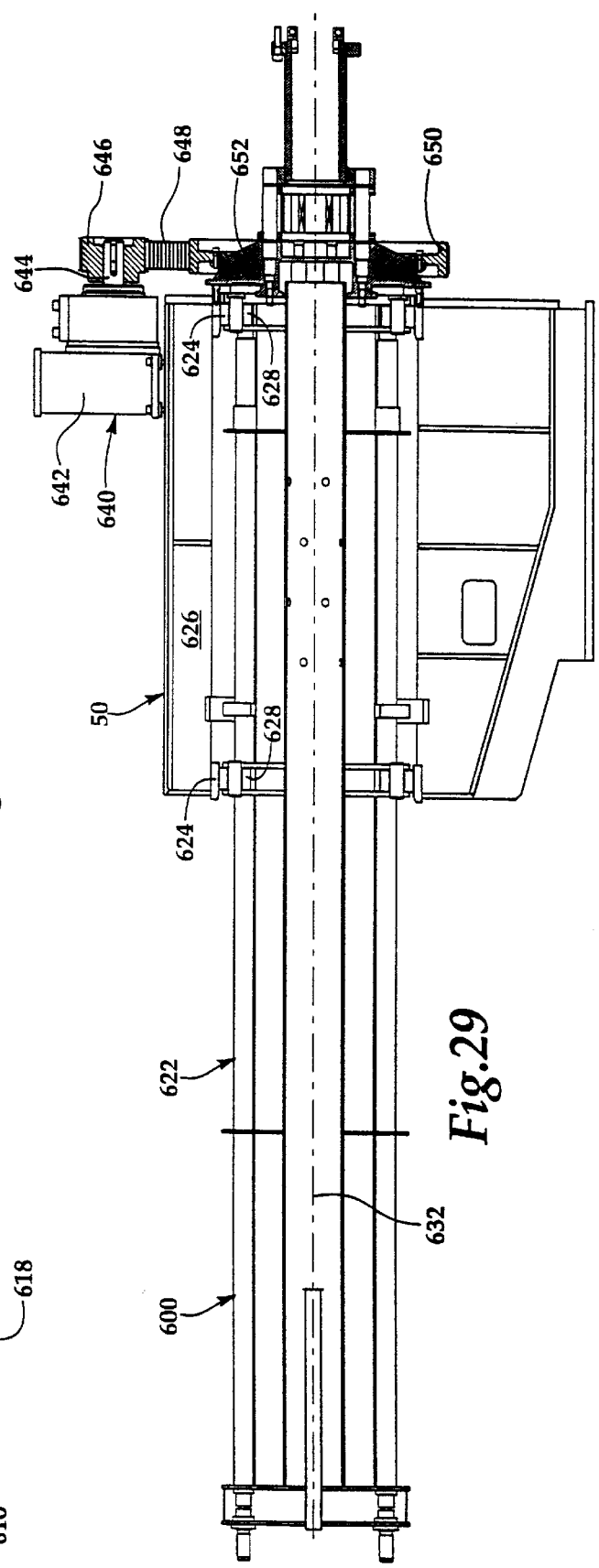
Fig.27
Fig.29

MULTI-SPINDLE CNC LATHE

CROSS-REFERENCE TO RELATED APPLICATIONS

This application is a continuation of application Ser. No. 09/740,360 filed Dec. 19, 2000, currently pending, which is a continuation of application Ser. No. 09/557,279 filed Apr. 24, 2000, now U.S. Pat. No. 6,164,173, which is a continuation of application Ser. No. 09/283,595 filed Apr. 1, 1999, now abandoned, which is a continuation of application Ser. No. 09/044,353 filed Mar. 19, 1998, currently abandoned, which is a continuation of application Ser. No. 08/869,047 filed Jun. 4, 1997, now U.S. Pat. No. 5,918,514, which is a continuation of application Ser. No. 08/514,734 filed Aug. 14, 1995, now U.S. Pat. No. 5,676,030.

TECHNICAL FIELD

This invention relates generally to machine tools, and more particularly to a multi-spindle CNC lathe that is particularly adapted for use in conjunction with JIT and SPC manufacturing philosophies.

BACKGROUND AND SUMMARY OF THE INVENTION

Machine tools, including drills, lathes, milling machines, grinders and other finishing machines, are all characterized by a common objective: the manufacture of extreme accuracy and maximum economy. As such, interest in and development of machine tools has paralleled the advance of the industrial revolution.

Traditionally, machine tools were operated by machinists who were among the most highly skilled and the most highly paid of all workers. More recently, however, machine tools have been adapted to a procedure known as computer numeric control, or CNC, whereby the operation of machine tools is regulated by computers or other programmable controllers. In accordance with the CNC technique, the dimensions, surface finishes, and other characteristics of the part to be manufactured are supplied in the form of sequential operating instructions which are utilized by the CNC device to regulate the operation of the machine tool. This allows the completion of finished parts with more uniformity and more rapidity than has ever been possible heretofore.

The adaptation of single spindle lathes, milling machines, and similar devices to CNC techniques has largely been successful. However, in the case of multi-spindle machine tools, previous attempts at automation have largely comprised adapting the cams, gears, and other components comprising such machines to servo control. Perhaps because the approach has been one of adapting old designs to new techniques, the effort to date at automating the operation of multi-spindle lathes by means of CNC operation has largely been unsuccessful.

The present invention comprises a multi-spindle lathe which is entirely adapted for CNC operation. In accordance with the broader aspects of the invention, a plurality of spindles are positioned at spaced points about a central axis. Each spindle has a collet which receives a length of stock and rotates the stock about a spindle axis. An indexing mechanism is provided for selectively positioning the spindles at work stations located at equally spaced points about the central axis. Each work station comprises an internal tool slide adapted to receive a cutting tool and to advance the cutting tool toward and away from the rotating stock under the action of a servo mechanism. An external tool slide is also provided for each work station and is adapted to advance a cutting tool both toward and away from and parallel to the axis of rotation of the stock. At each work station the stock is turned rather than formed, meaning that the cutting tools of the individual work stations may be utilized to perform a variety of quite distinct machining operations.

The multi-spindle CNC lathe of the present invention is readily adapted for use in conjunction with both the Just In Time (JIT) and the Statistical Process Control (SPC) manufacturing philosophies. In accordance with JIT, only the exact No. of piece parts necessary to complete a particular assembly operation are ordered at any one time. This eliminates the investment in inventory which is necessary when large numbers of piece parts are ordered simultaneously, and also eliminates the possibility that previously ordered parts will become obsolete due to a change in design. The machine tool of the present invention is adapted to JIT because the economic batch is smaller. This is because machine tools incorporating the invention do not require the changing of the cutting tools utilized at the various work stations in order to change the nature of the piece parts being manufactured, and because set up time is reduced dramatically.

In accordance with SPC, completed piece parts are compared with a predetermined standard with a view towards maintaining the dimensions of each part at the center of the tolerance range. If the dimensions of the parts being manufactured begin to vary from the center of the tolerance

BRIEF DESCRIPTION OF THE DRAWINGS

A more complete understanding of the invention may be had by reference to the following Detailed Description, when taken in conjunction with the accompanying Drawings wherein:

FIG. 2 is a front view of the base of the multi-spindle CNC lathe of FIG. 1 in which certain parts have been broken away more clearly to illustrate certain features of the invention;

FIG. 3 is a top view of the base of FIG. 2;

FIG. 10 is a further illustration of certain components shown in FIG. 9;

FIG. 11 is a side view of one of the internal slide assemblies of the multi-spindle CNC lathe of FIG. 6 in which certain components have been broken more clearly to illustrate certain features of the invention;

FIG. 13 is an illustration of one of the external slide assemblies of the multi-spindle CNC lathe of the present invention;

FIG. 14 is a sectional view taken along the line 14—14 of FIG. 13;

FIG. 15 is a sectional view taken along the line 15—15 of FIG. 14 further illustrating the external slide assemblies of the multi-spindle CNC lathe of the present invention;

FIG. 16 is longitudinal sectional view further illustrating the external slide assemblies of the multi-spindle CNC lathe of the present invention;

FIG. 17 is a sectional view taken along the line 17—17 of FIG. 13;

FIG. 18 is an enlargement of a certain portion of the apparatus illustrated in FIG. 17;

FIG. 26 is an enlarged illustration of one of the castings comprising the frame of the present invention;

FIG. 27 is an illustration of the one of the stock carrying tubes of the multi-spindle CNC lathe of the present invention;

FIG. 28 is an enlarged sectional view further illustrating the stock carrying tubes of the multi-spindle CNC lathe of the-present invention;

FIG. 29 is a front view illustrating the stock carriage assembly of the multi-spindle CNC lathe of the present invention;

DETAILED DESCRIPTION

Figure 1:
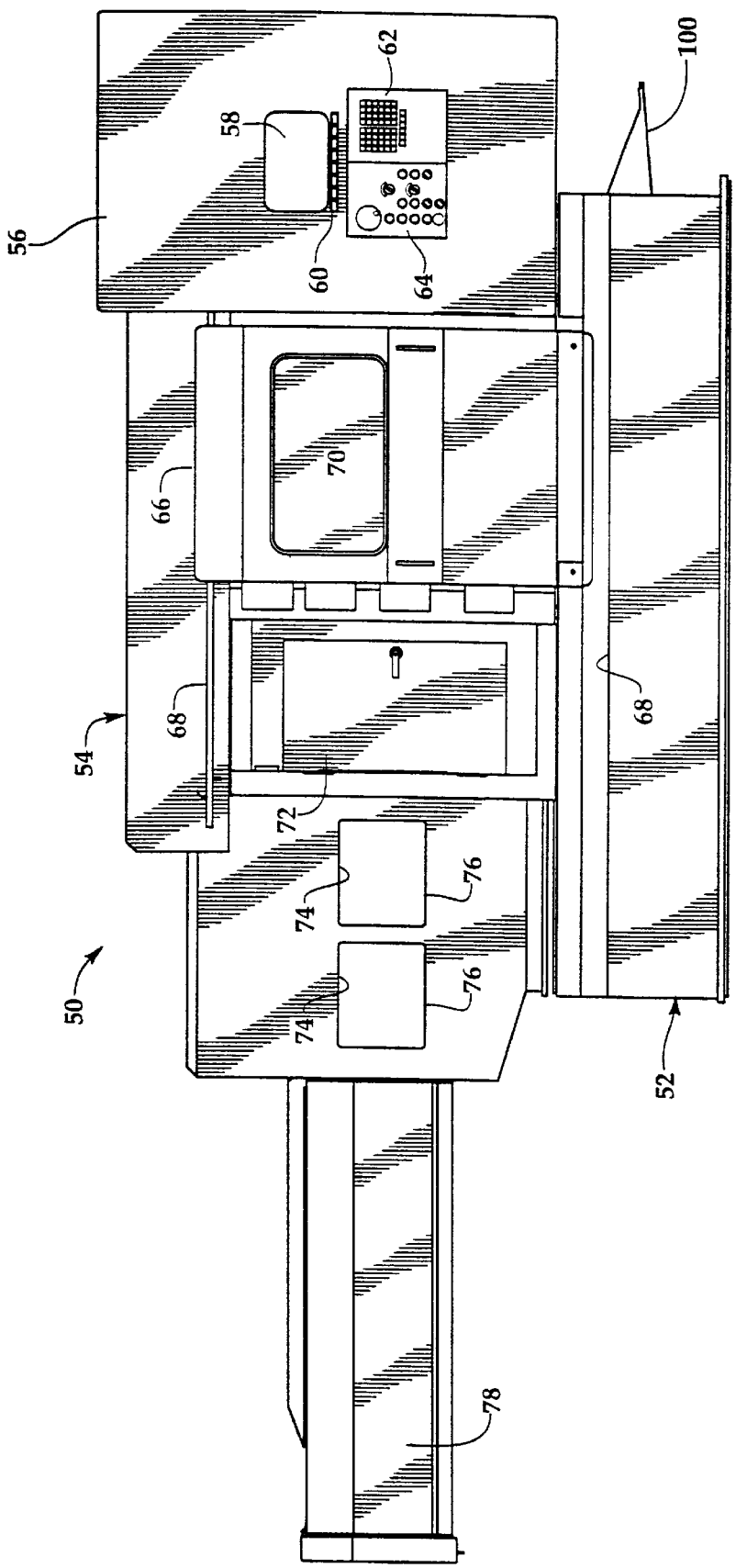
FIG. 1 is a front view of a multi-spindle CNC lathe incorporating the present invention.

Referring now to the Drawings, and particularly to FIG. 1 thereof, there is shown a multi-spindle CNC lathe 50 incorporating the present invention. The lathe 50 includes a base 52 which also serves as a coolant reservoir. A housing 54 extends upwardly from the base 52 and serves to enclose and protect both the mechanical components and the production components of the multi-spindle CNC lathe 50.

A computer numeric control (CNC) system 56 is located at one end of the housing 54. The CNC system 56 is preferably of the type sold by General Electric Company as and identified by that company as the Power Mate Motion Control Systems, and may include a computer monitor screen 58 and/or a plurality of status lights 60. A keyboard 62 may be used to effect computer control over the operation of the lathe 50. The CNC unit 56 may further include a conventional control panel 64.

The housing 54 of the multi-spindle CNC lathe 50 further includes a sliding access door 66. The door 66 is slidably supported on a slideways 68 and is provided with a viewing window 70. The production components of the multi-spindle CNC lathe 50 are located behind the door 66 when it is in the closed position as illustrated in FIG. 1, and are observable through the viewing window 70 thereof.

A hinged door 72 provides access to the mechanical components of the lathe 50. Access ports 74 are normally enclosed by removable covers 76. A cover 78 enclosing the stock carriers of the lathe 50 extends leftwardly (FIG. 1) from the main portion of the housing 54.

Referring now to FIGS. 2 & 3, the base 52 of the multi-spindle CNC lathe 50 is shown in greater detail. The base 52 is comprised entirely of steel plates which are interconnected by welding. The base 52 is provided with a plurality of mounting blocks 80 and a plurality of mounting holes 82 which function to attach the operating components of the lathe 50 to the base 52.

In addition to supporting and locating the operating components of the lathe 50, the base 52 serves as a coolant reservoir. Coolant entering the base 52 is initially contained by a plate 84 which defines a coolant level 86. Chips caused by operation of the multi-spindle CNC lathe 50 enter the base 52 through a port 88 and are received on a chip conveyor 90 located above the plate 84. The conveyor 90 transports the chips out of the base 52, whereupon the chips fall into a chip receiving container 92 under the action of gravity.

During operation of the lathe 50, coolant constantly flows over a lip 94 located at' one end of the plate 84. From the lip 94 the coolant flows into and through a basket 96 which functions to strain the coolant, thereby removing any debris which is not transported out of the base 52 by the chip conveyor 90. Preferably, two baskets 96 are employed in the operation of the lathe, one located in the working position as defined by a bracket 98 and the other positioned on a drain platform 100 which allows coolant to drain out of the basket 96 prior to the removal of debris therefrom. Coolant flowing through the basket 96 located in the working position as defined by the bracket 98 flows along a path defined by the arrows 102 and is returned to the operating components of the lathe 50 by a pump (not shown) which withdraws the coolant from the base at aperture 103. This flow path maintains a uniform temperature of the base 52 and eliminates static spots which can cause the coolant to become rancid.

Figure 4:
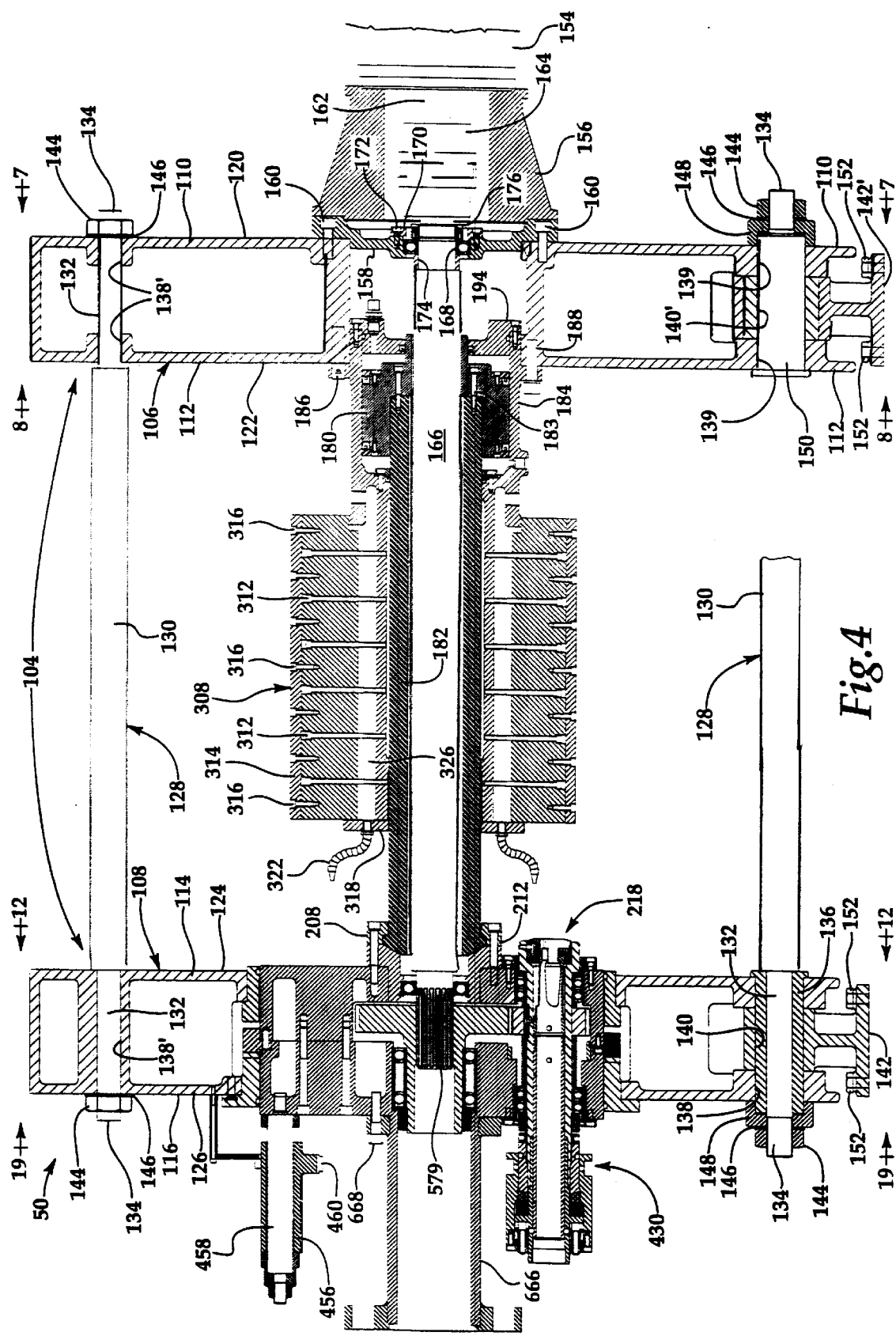
FIG. 4 is a longitudinal sectional view illustrating the frame and certain operating components of the multi-spindle CNC lathe of FIG. 1.

As is best shown in FIG. 4, the multi-spindle CNC lathe 50 includes a frame 104 comprising an important feature of the invention. The frame 104 includes precision castings 106 and 108 which function to support and align the operating components of the lathe 50. The casting 106 comprises opposed walls 110 and 112, and the casting 108 comprises opposed walls 114 and 116.

The walls 110 and 112 of the casting 106 define opposed surfaces 120 and 122, respectively. The surfaces 120 and 122 are ground flat and smooth utilizing Blanchard grinding or a functionally equivalent process. The same procedure assures precise parallelism between the surfaces 120 and 122. The-walls 114 and 116 comprising the casting 108 define opposed surfaces 124 and 126 which are identically processed, and are therefore equally flat, smooth, and parallel. The surfaces 122 and 124 define the alignment surfaces of the frame 104 of the lathe 50.

The frame 104 further comprises four tie rods 128 which are match machined in order to maintain precise parallelism between the surface 122 of the casting 106 and the surface 124 of the casting 108. Each tie rod 128 includes an elongate central portion 130 extending to reduced diameter portion 132 which in turn extends to a threaded end member 134. At the bottom of the casting 108, a bushing 136 is mounted on each reduced diameter portion 132 and is received in aligned apertures 138 formed in the casting 108 and an aperture 140 formed in a mounting block 142.

A plurality of nuts 144 are each threadedly engaged with a threaded end portion 134 of one of the tie rods 128. The nuts 144 engage washers 146 which in turn engage compression members 148. Thus, upon precise tightening of the nuts 144, using, for example, a torque wrench, the castings 106 and 108 comprising the frame 104 are securely positioned with respect to one another.

At the upper ends of the castings 106 and 108, and at the lower end of the casting 106, the reduced end portions of the rods 128 extend through apertures 138' formed in the castings 106 and 108. Likewise, the nuts 144 engage the washers 146 which directly engage the castings 106 and 108.

The casting 106 is supported on a mounting block 142, which bridges across the base 52 and is supported by the mounting blocks 80 thereof.

The mounting blocks 142 and 142' are secured to the base 52 by a plurality of threaded fasteners 152. The mounting blocks 142 engage the mounting blocks 80 of the base 52 to precisely position the frame 104 with respect thereto. An important aspect of the present invention comprises the use of the three point mounting system comprising the two mounting blocks 142 and 142' to mount the frame 104 on the base 52. By this means any possibility of tipping, wobbling, or misalignment between the base 52 and the frame 104 is eliminated.

Figure 32:
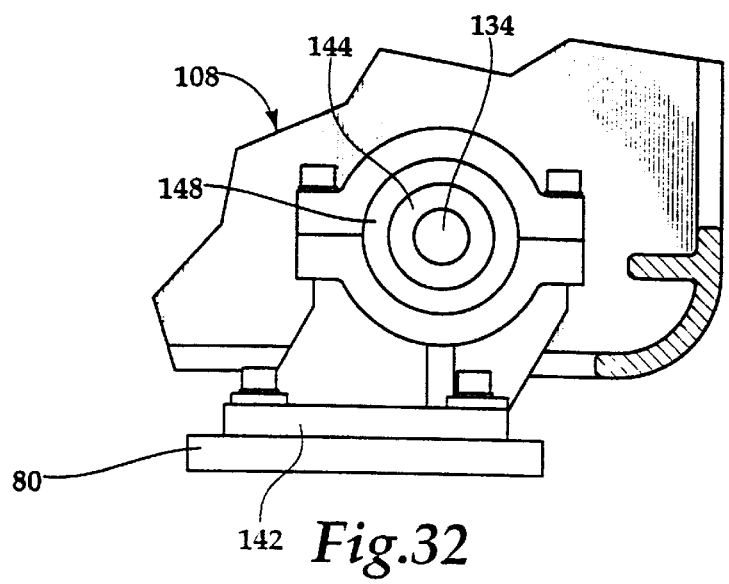
FIG. 32 is a further illustration of the three point mounting system of the frame of the multi-spindle CNC lathe of the present invention.
Figure 33:
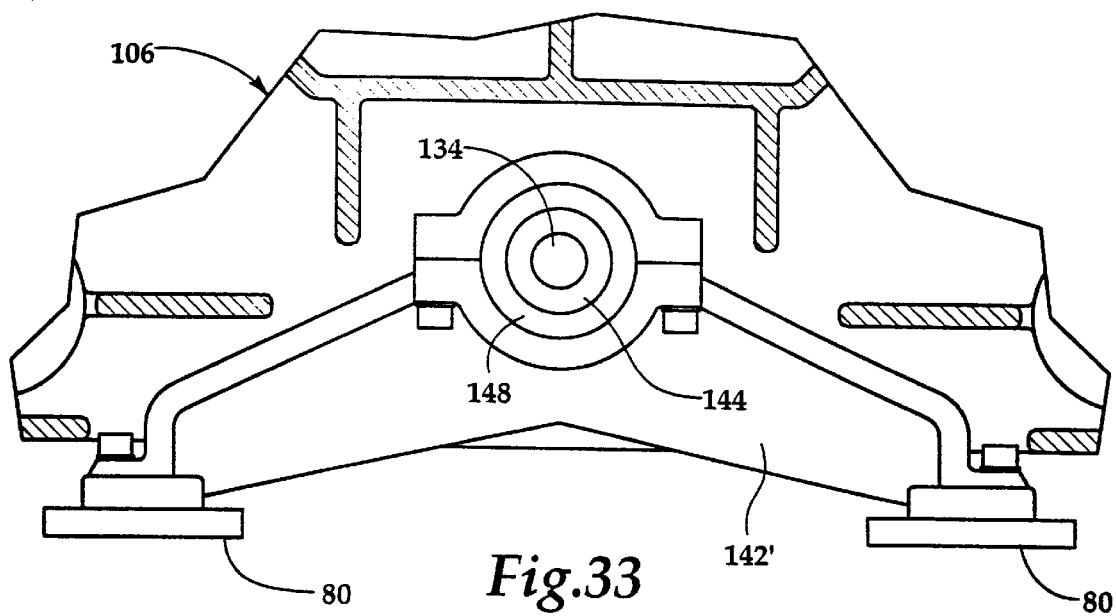
FIG. 33 is a still further illustration of the three point mounting system of the frame of the multi-spindle CNC lathe of the present invention.

The three point mounting system which supports the frame 104 on the base 52 is further illustrated in FIGS. 32 and 33. Each mounting block 142 engages an individual mounting block 80 of the base 52 to support the casting 108 at two parts. In contrast, the mounting block 142' bridges between two mounting blocks 80 and supports the casting 106 at a single, central point, thereby providing three point support for the frame 104. A pin 150 extends through aligned apertures 138 in the casting 106, and an aperture 103 formed in the center of the mounting block 142'. A nut 144 is threadably engaged within the end portion 134 of the pin 150, and engages a washer 146 which engages a compression member 148.

A spindle drive motor 154 is mounted at one end of the frame 104 of the multi-spindle CNC lathe 50. The spindle drive motor is preferably a variable speed alternating current electric motor. The motor 154 is supported by a motor mounting adaptor 156 which is in turn supported by a bearing housing 158. The bearing housing 158 is secured to the wall 110 of the casting 106 of the frame 104 by a plurality of threaded fasteners 160.

The motor 154 has an output shaft 162 which extends to a flexible coupling 164. The flexible coupling 164 in turn-drives a spindle drive shaft 166. The drive shaft 166 is rotatably supported by a bearing 168 which is retained in the bearing housing 158 by an end plate 170 that is in turn secured by threaded fasteners 172. A spacer 174 and a lock nut 176 complete the drive shaft/bearing assembly.

Figure 5:
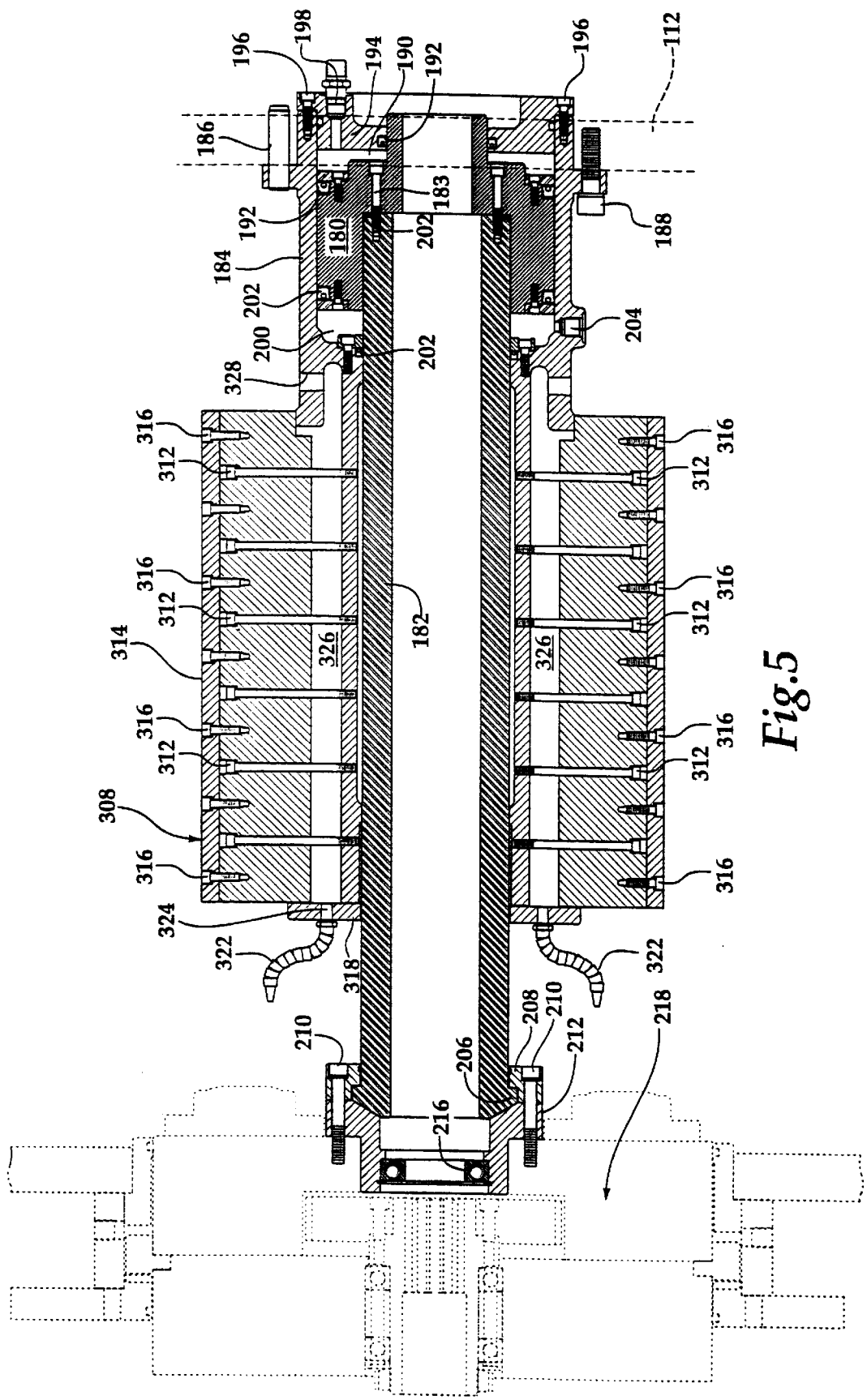
FIG. 5 is an enlargement of a portion of FIG. 4.
Figure 6:
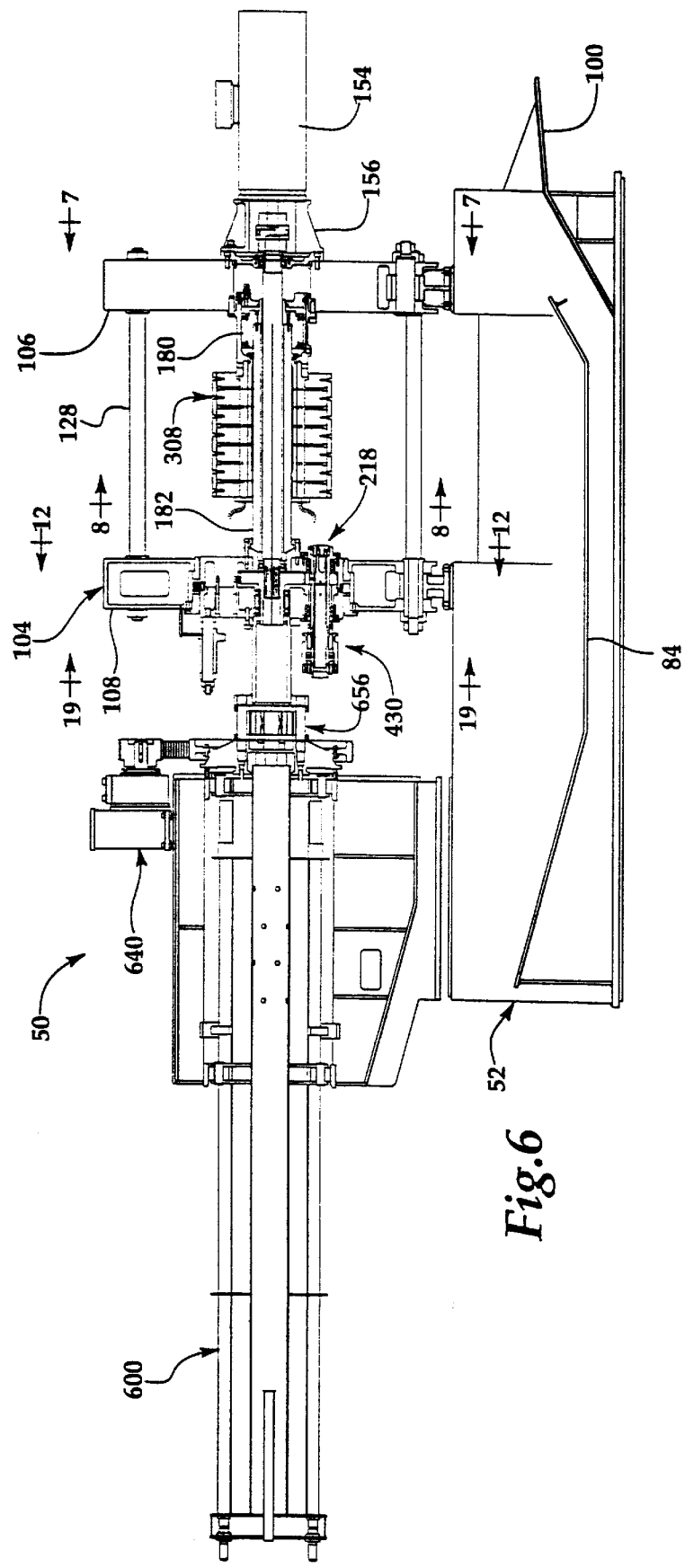
FIG. 6 is a front view of the multi-spindle CNC lathe of the present invention similar to FIG. 1 in which the covers of the apparatus have been removed.

Referring to FIGS. 4 and 5, the drive shaft 166 extends through a piston 180 which is secured to a tubular ram 182 by a plurality of threaded fasteners 183. The piston 180 is mounted in a cylinder 184 which is located the retaining ring 208 also function to secure the tubular ram 182 to a spindle carrier assembly 218.

The working -components of the multi-spindle CNC lathe 50 is illustrated in FIGS. 6 through 19, inclusive. As is clearly shown, for example, in FIGS. 7, 8, and 9, the particular multi-spindle CNC lathe 50 illustrated in the Drawings and described herein comprises an eight spindle device. However, as will be appreciated by those skilled in the art, the present invention is readily adapted for use in conjunction with multi-spindle CNC lathes having any desired number of spindles as may be dictated by the requirements of a particular application of the invention.

Figure 7:
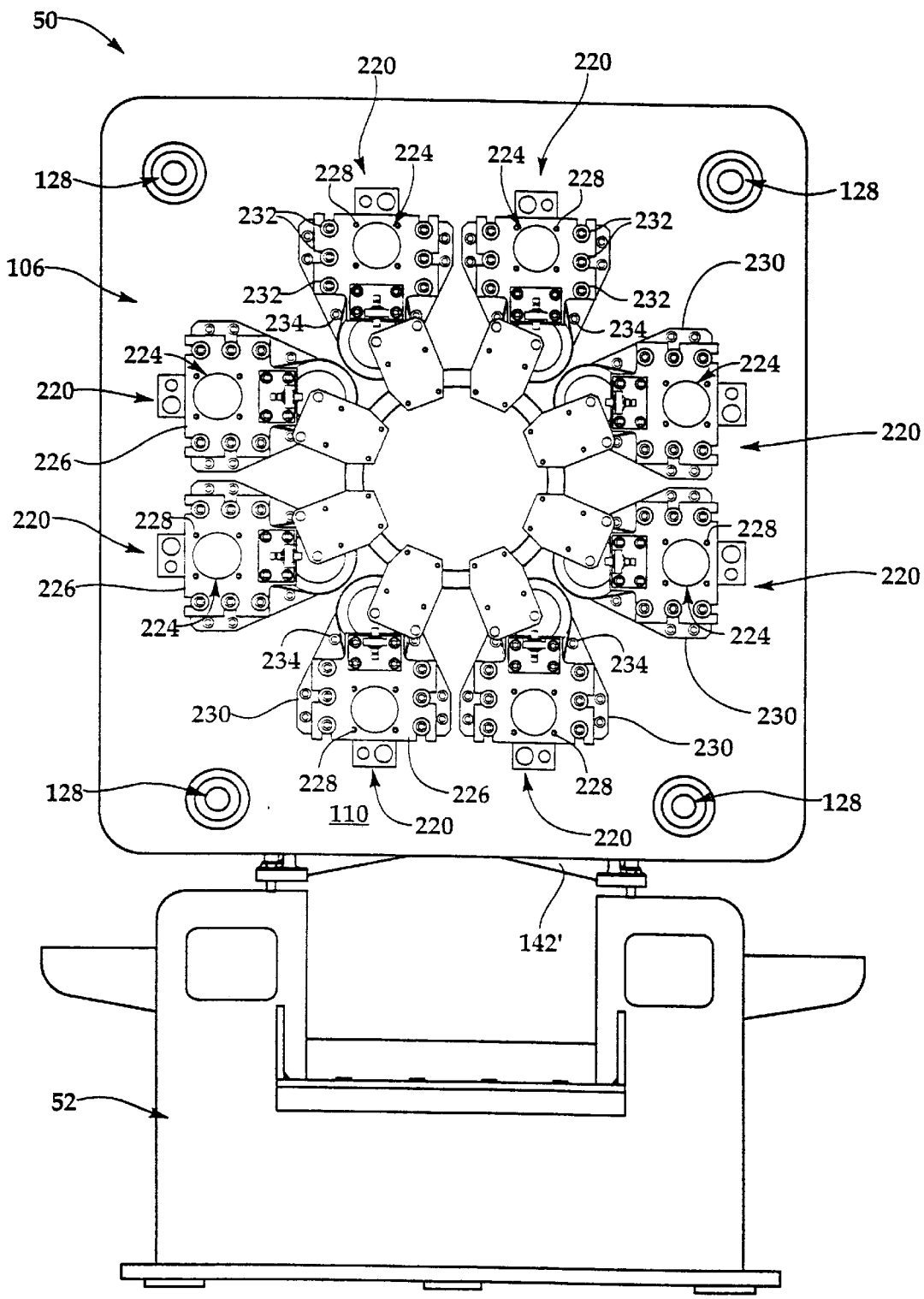
FIG. 7 is an illustration of certain components of the multi-spindle CNC lathe of FIG. 6 taken along the line 7—7 of FIG. 6.
Figure 8:
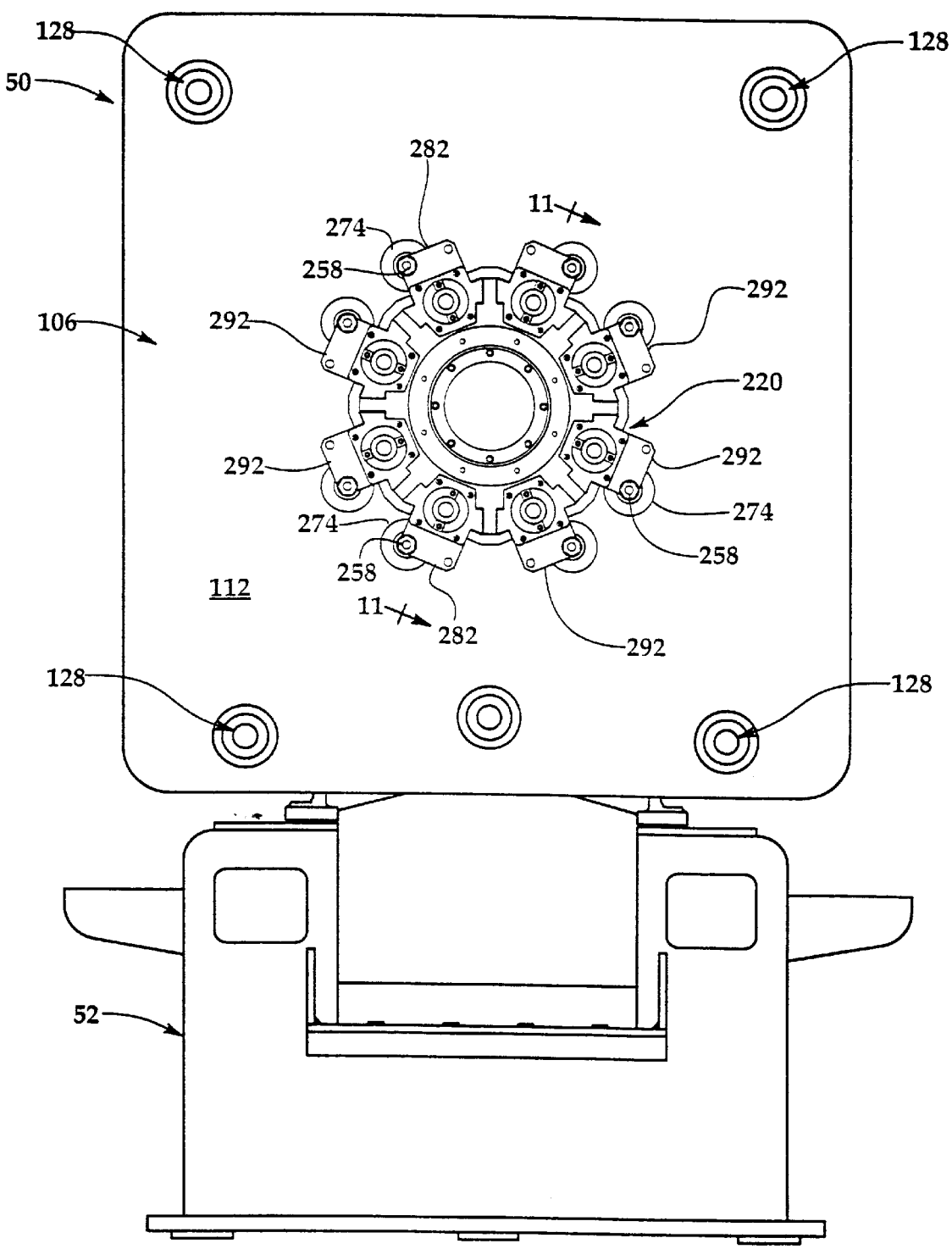
FIG. 8 is an illustration of certain components of the multi-spindle CNC lathe of FIG. 6 taken along the line 8—8 in FIG. 6.

Internal slide assemblies 220 comprising the multi-spindle CNC lathe 50 are illustrated in FIGS. 7, 8, 9, 10, and 11, inclusive. Referring particularly to FIGS. 7 and 11, each internal slide assembly 220 includes a motor 224 which is secured to a motor mounting plate 226 by a plurality of threaded fasteners 228. The motor mounting plate 226 is in turn secured to a mounting plate 230 by a plurality of threaded fasteners 232. The mounting plate 230 is in turn secured to the wall 110 of the casting 106 comprising the frame 104 by a plurality of threaded fasteners 234.

The motor 224 has an output shaft 236 which is secured to a drive pulley 238. A drive belt 240 extends around the drive pulley 238 and a driven pulley 242. The driven pulley 242 is mounted on a spacer 244 which is in turn secured to an adapter 246. Thus, upon operation of the motor 224, the adapter 246 is rotated under the action of the motor 224, the output shaft 236, the drive pulley 238, the belt 240, the driven pulley 242, and the spacer 244.

The adapter 246 is rotatably supported on the wall 110 by bearings 248. The bearings 248 are supported in a bearing housing 250 by a plurality of threaded fasteners 252 which extend through the mounting plate 230. A ball nut 254 is mounted on the adapter 246 and is secured thereto by a plurality of threaded fasteners 256.

A ball screw 258 extends through and is operatively engaged with the ball nut 254. The ball screw 258 is secured against rotation relative to the ball nut 254. Thus, upon actuation of the motor 224 to rotate the adapter 246 and the ball nut 254, the ball screw 258 is selectively extended or retracted.

A target adapter 260 extends from one end of the ball screw 258 and supports a target 262. A sensor bracket 264 is secured to the mounting plate 226 by a plurality of threaded fasteners 266. Proximity sensors 268, 270, and 272 are mounted on the bracket 264. Upon the alignment of the target 262 therewith, the proximity sensors 268, 270, and 272 are actuated to generate a signal indicative of the positioning of the ball screw 258 relative to the frame 104 of the lathe 50. Proximity sensor 270 is indicative of the normal positioning of the ball screw 258, proximity sensor 272 is indicative of the fully retracted positioning of the ball screw 258, and proximity sensor 268 is indicative of the fully extended position of the ball screw 258.

The motor 224 operates under control of the CNC system 56 to position the ball screw 258. The outputs of the proximity sensors 268, 270, and 272 are directed to the CNC system 56, which in turn operates the motor 224 to properly position the ball screw 258 in accordance with the program being run.

The ball screw 258 extends through a ball screw boot 274. The boot 274 is secured to the wall 112 of the casting 106 of the frame 104 by a plurality of threaded fasteners 276. At the distal end of the boot 274 there is provided a rod wiper 278.

The end of the ball screw 258 remote from the target adapter 260 is provided with a threaded portion 280. A pusher bracket 282 is secured to the end of the ball screw 258 by a nylon insert lock nut 284 threadably engaged with the end 280 of the ball screw 258. A flat washer 286 is located between the pusher bracket 282 and the ball screw 258.

A slide body 292 is secured to the pusher bracket 282 for reciprocation under the action of the ball screw 258 and the ball nut 254 which is in turn actuated by the motor 224 under the control of the CNC system 56. Drive keys 294 are mounted at one end of the slide body 292 and is secured thereto by a plurality of threaded fasteners 296. The slide body 292 is provided with a conventional central bore 298 and is adapted to receive a conventional tool holder, which in turn receives a conventional tool such as a drill, reamer, etc.

Those skilled in the art will appreciate the fact that the slide body 292 and tool holder received therein comprise static devices which are adapted to provide end working functions on rotating stock. The internal tool slide assembly 220 is also adapted for use with active slide components adapted for performing end working functions such as tapping, profile work, etc. and also for performing the pick up function after the work piece has been severed.

Figure 31:
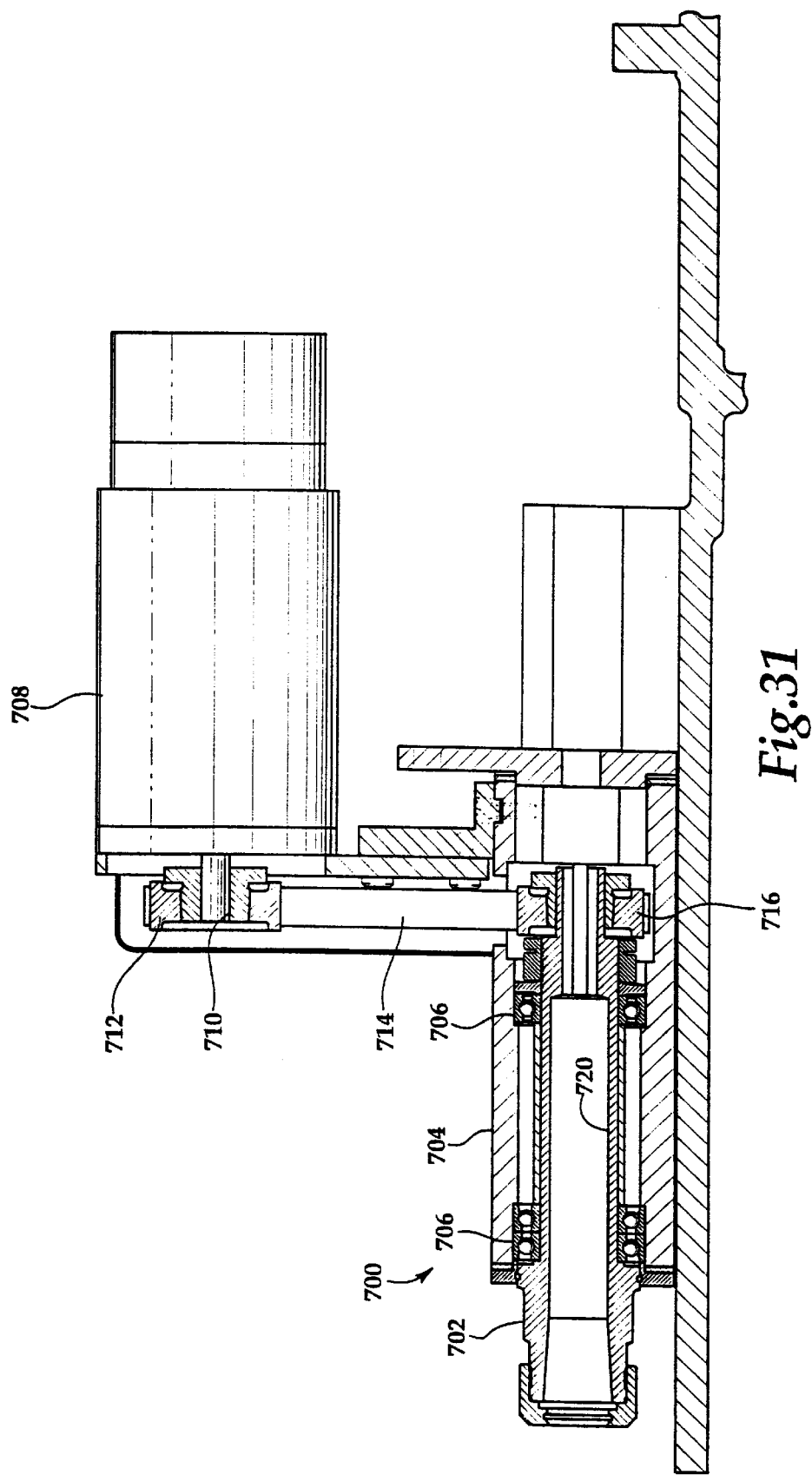
FIG. 31 is a partial sectional view illustrating a tool holder accessory useful in conjunction with the multi-spindle CNC lathe of the present invention.

FIG. 31 illustrates an active tool holder assembly 700 which may be used in lieu of the passive tool holder assembly of FIG. 11 in the internal slide assembly of the multi-spindle CNC lathe 50 of the present invention, if desired. The tool collet holder assembly 700 includes a tool holder receiver 702 which is rotatably supported on a sub-frame 704 by bearings 706. A motor 708 has an output 710 which drives a drive pulley 712. A belt 714 extends around the drive-pulley 712 and a driven pulley 716 which is operatively connected to the tool holder receiver 702. In the use of the apparatus 700, a conventional tool holder is positioned in the bore 720 of the tool holder receiver 702. The tool holder in turn receives a conventional tool. By means of the motor 708, the tool is adapted for rotation as it is advanced toward and away from the rotating stock. By this means the tool may be utilized to provide, for example tapping of the stock.

Figure 9:
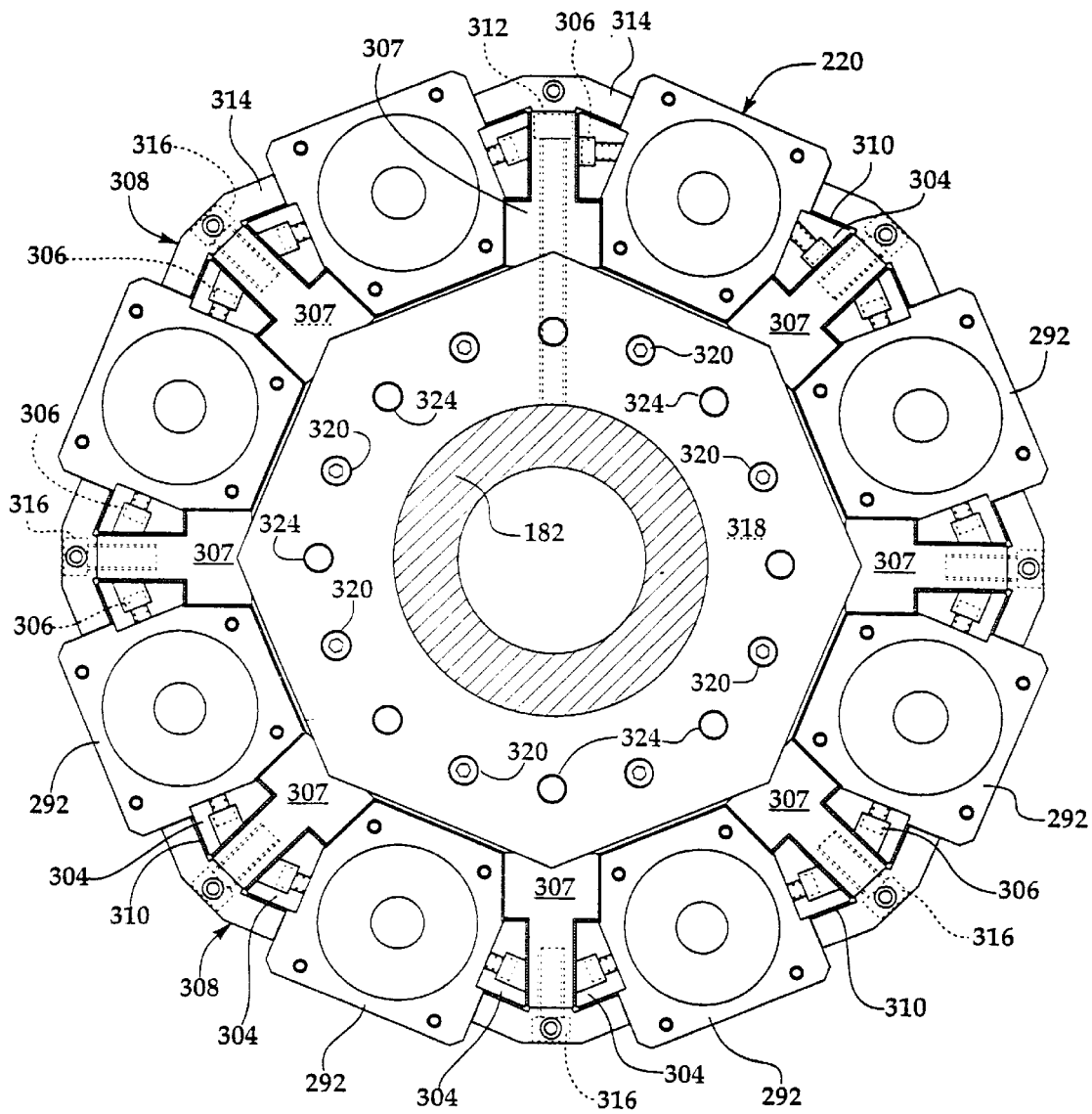
FIG. 9 is an enlargement of a portion of FIG. 8.
Figure 12:
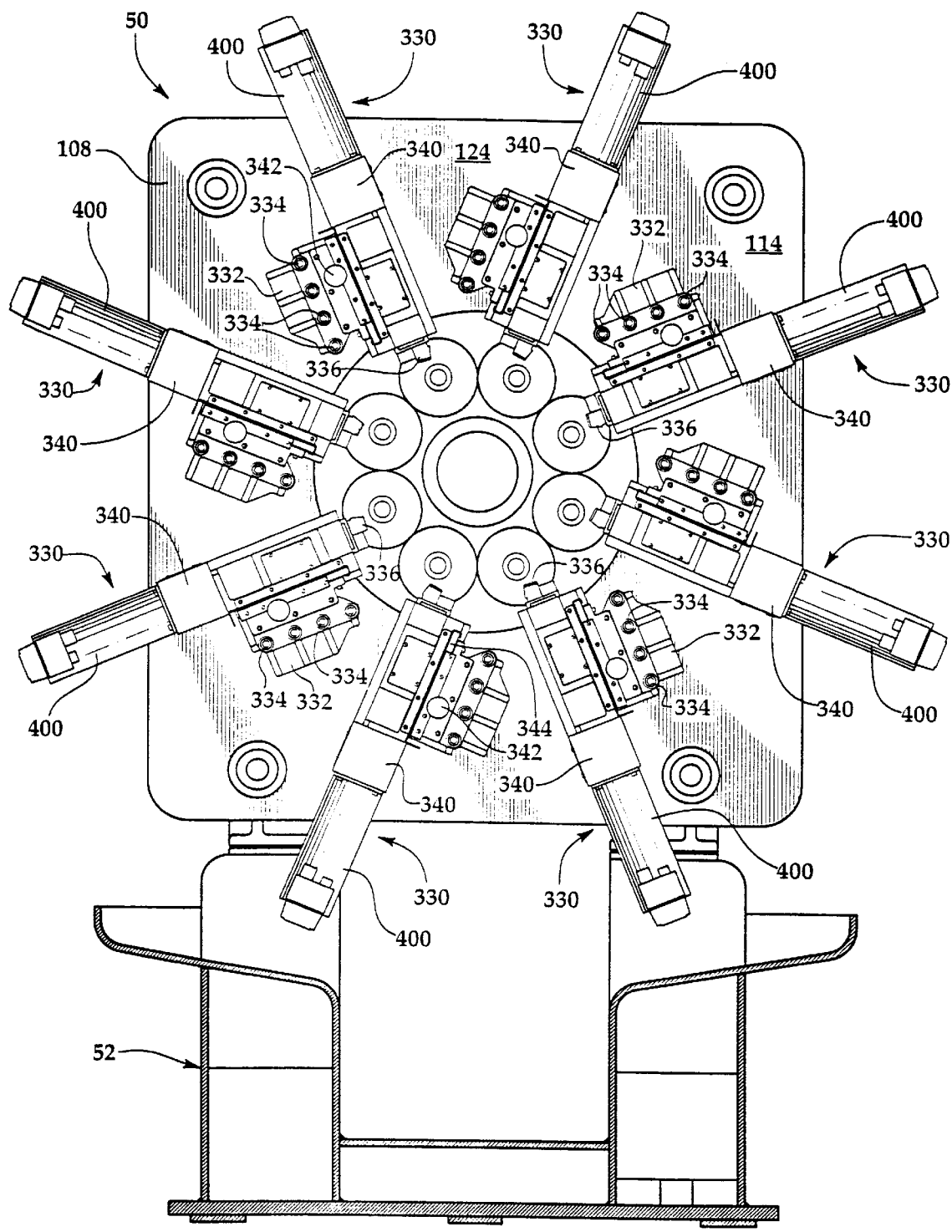
FIG. 12 is an illustration of certain components of the multi-spindle CNC lathe of FIG. 6 taken along the line 12—12 of FIG. 6.

Referring to FIG. 9, each slide body 292 has a pair of guide blocks 304 secured thereto by threaded fasteners 306. The guide blocks 304 are received in correspondingly shaped, hardened and precision ground, guideways formed in a support body 308 and defined by components 307 and 314. Sliding movement of the guide blocks 304, and therefore the slide bodies 292, is facilitated by the positioning of layers of polytetrafluroethylene 310 between the guide blocks 304 and the corresponding guideways.

The construction of the support body 308 will be best understood by simultaneous reference to FIGS. 5 and 9. The component parts 307 of the support body 308 comprising the guideways are secured to the cylinder 184 by a plurality of threaded fasteners 312. The component parts 314 are secured by a plurality of threaded fasteners 316. A cover plate 318 is mounted at the end of the support body 308 remote from the piston 180 and is secured by a plurality of threaded fasteners 320.

Coolant is discharged from flexible nozzle assemblies 322 to the working area. The nozzle assemblies 322 are selectively mounted in discharged apertures 324 provided in the cover plate 318. The apertures 324 extend to a passageway 326. Coolant is directed into the passageway 326 for discharge from the flexible nozzle assemblies 322 through an inlet port 328 formed in the cylinder 184.

Referring now to FIGS. 12 through 19, inclusive, the multi-spindle CNC lathe 50 includes a plurality of external slide assemblies 330. Each external slide assembly 330 is supported on the wall 114 of the casting 108 of the frame 104 by a support bracket 332 which is secured to the wall 114 by a plurality of threaded fasteners 334. Each external slide assembly 330 is adapted to support and position a cutting tool 336 relative to rotating stock. The external slide assemblies 330 function to move cutting tools 336 both toward and away from the rotating stock and toward and away from the wall 114 of the frame 104, i.e., parallel to the stock.

Referring to FIGS. 13 and 15, each external slide assembly 330 includes a housing 340 which is guided by a circular guide 342 and a rectangular guide 344. The guide 342 is mounted on the housing 340 and is slidably supported by bushings 343 mounted on the bracket 332. The guide 344 is mounted on the bracket 332 and is secured by threaded fasteners 335.

Figure 19:
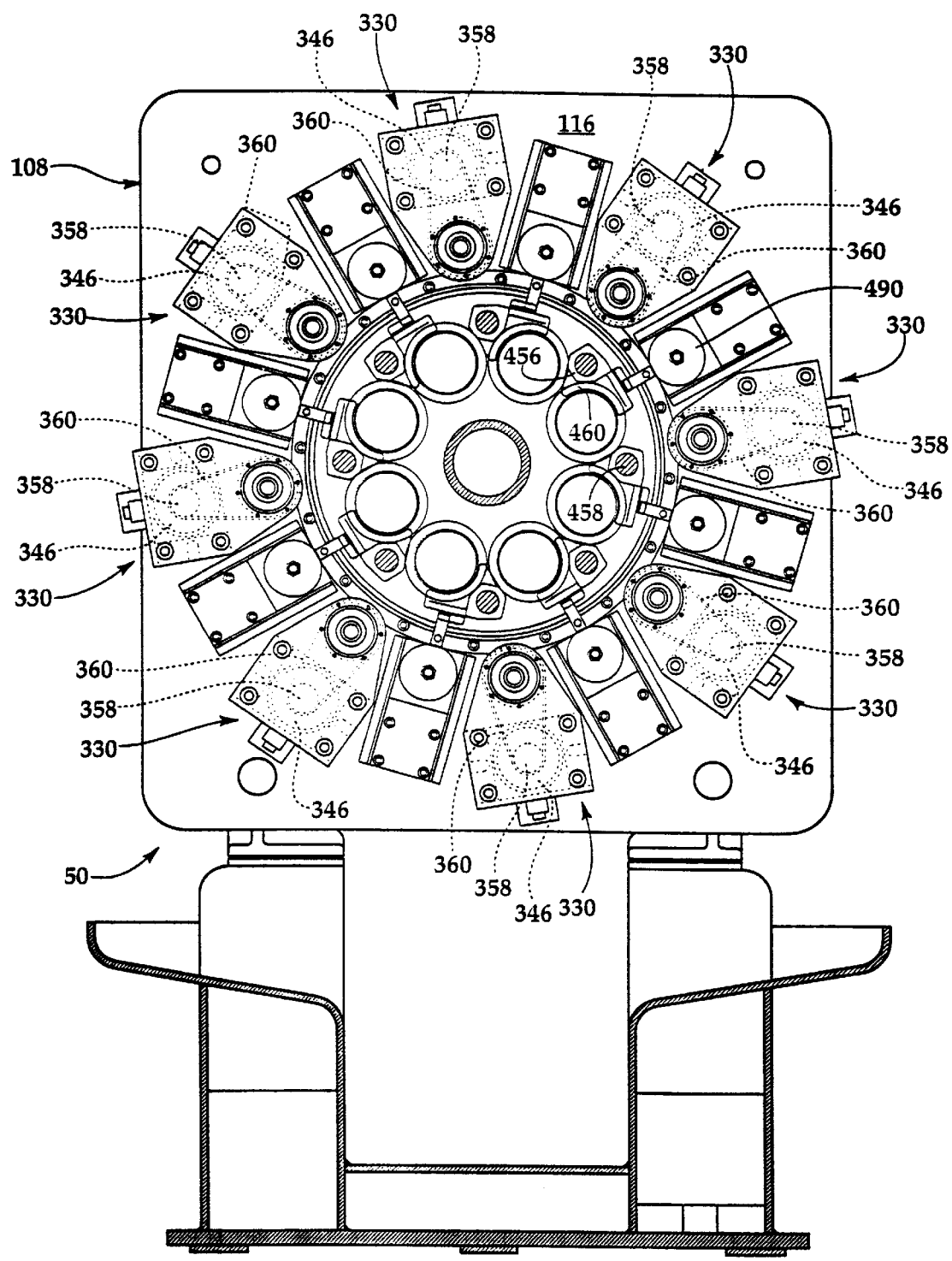
FIG. 19 is an illustration of certain of the components of the multi-spindle CNC lathe of the present invention taken along the line 19—19 of FIG. 6.

Referring to FIGS. 15 and 19, a motor 346 is mounted on a motor mounting plate 350 and is secured thereto by a plurality of threaded fasteners. The motor mounting plate 350 is in turn supported on a mounting plate 352 by a plurality of threaded fasteners 354.

The motor 346 has an output shaft 356 which is connected to a drive pulley 358. The drive pulley 358 drives a belt 360 which in turn drives a driven pulley 362. The driven pulley 362 is secured on a adapter 364 by a spacer 366. The adapter 364 is rotatably supported on the wall 116 by a bearing 368 which is mounted in a bearing housing 370. The bearing housing 370 is secured in the plate 352 by a plurality of threaded fasteners 372.

A ball nut 374 is secured to the adapter 364 by a plurality of threaded fasteners 376. Thus, upon actuation of the motor 346 operating through the output shaft 356, the drive pulley 358, the drive belt 360, and driven pulley 362, the adapter 364, and the spacer 366, the ball nut 374 is actuated to rotate relative to the wall 116. A ball screw 378 extends through and is operatively connected to the ball nut 374.

A target adapter 380 is secured to one end of the ball screw 378 and has a target 382 mounted on the distal end thereof. A plurality of proximity sensors 384, 386, and 388, are mounted on a support plate 390 which is secured to the motor mounting plate 350 by a plurality of threaded fasteners 392. When the target 382 is aligned with one of the proximity sensors 384, 386, or 388, a signal is generated indicative of the positioning of the housing 340 of the external slide assembly relative to the wall 114 of the frame 104.

The end of the ball screw 378 remote from the target adapter 380 comprises a threaded end portion 394. The ball screw 378 is secured to the housing 340 of the external slide assembly 330 by a nylon insert lock nut 396. Therefore, upon operation of the motor 346, the ball nut 374 functions to actuate the ball screw 378 to locate the housing 340 relative to the wall 114. Referring to FIG. 16, the housing 340. is supported for sliding movement toward and away from the wall 114 by guide members 342 and 344.

The motor 346 operates under control of the CNC system 56 to position the ball screw 378. The outputs of the proximity sensors 384, 386, and 388 are directed to the CNC system 54 which in turn operates the motor 346 to position the ball screw 378 in accordance with the program being run.

As is best shown in FIGS. 16 and 17, a motor 400 is mounted at the end of the housing 340 remote from the cutting tool 336. The motor 400 has an output shaft 402 which is connected to a flexible coupling 404 which is in turn connected to one end of a ball screw 406. The ball screw 406 is rotatably supported by bearings 408 and 410 mounted in the housing 340.

A ball nut 412 is mounted on and operatively connected to the ball screw 406. The ball nut 412 is secured to a tool slide 414 which is slidably supported in the housing 340 by a plurality of threaded fasteners 416. Thus, upon actuation of the motor 400 to rotate the ball screw 406, the ball nut 412 functions to move the slide 414 and therefore the cutting tool 336 inwardly and outwardly relative to the housing 340.

The motor 400 operates under control of the CNC system 56. The motor 400 and the slide 414 have associated therewith a target and a plurality of proximity sensors like the target 382 and the sensors 384, 386, and 388 associated with the ball screw 378. The CNC system 56 receives signals from the sensors to allow control over the positioning of the cutting tool 336.

Referring particularly to FIG. 18, there is shown a quick disconnect coupling for the cutting tool 336. The cutting tool 336 is supported on a threaded fastener 416 positioned within the slide 414. The cutting forces resulting from engagement of the cutting tool 336 with rotating stock are taken by a reaction block 418 which is secured to the slide 414 by a threaded fastener 419. The threaded fastener 416 and therefore the cutting tool 336 are normally secured in the position shown in FIG. 18 by a retaining bar 420 having a ramp portion 422. A pin 424 is positioned between the ramp portion 422 and the threaded fastener 416 and functions to retain the threaded fastener 416 and therefore the cutting tool 336 in place. A spring 426 normally retains the bar 420 in place.

A stop 428 is mounted in the housing 340 at the remote end of the slide 414. When the slide 414 is fully retracted under the action of the ball nut 412 and the ball screw 406, the bar 420 engages the stop 428. This action compresses the spring 426 thereby relieving the pressure imposed on the pin 424 by the ramp portion 422. This in turn allows the cutting tool 336 and the threaded fastener 416 to be disengaged from the slide 414.

Figure 20:
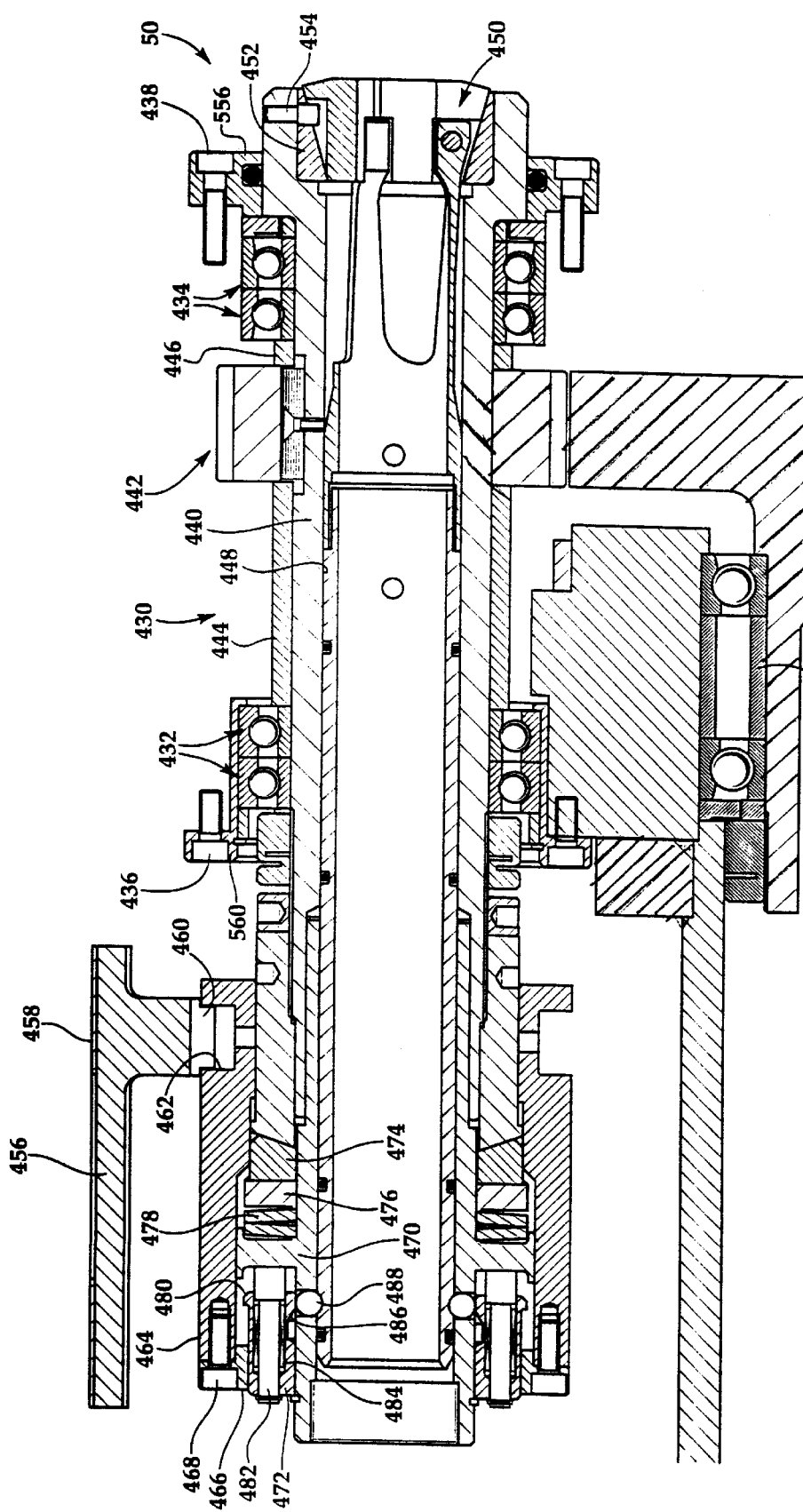
FIG. 20 is an illustration of one of the spindles of the multi-spindle CNC lathe of the present invention showing the component parts thereof in a first orientation.
Figure 21:
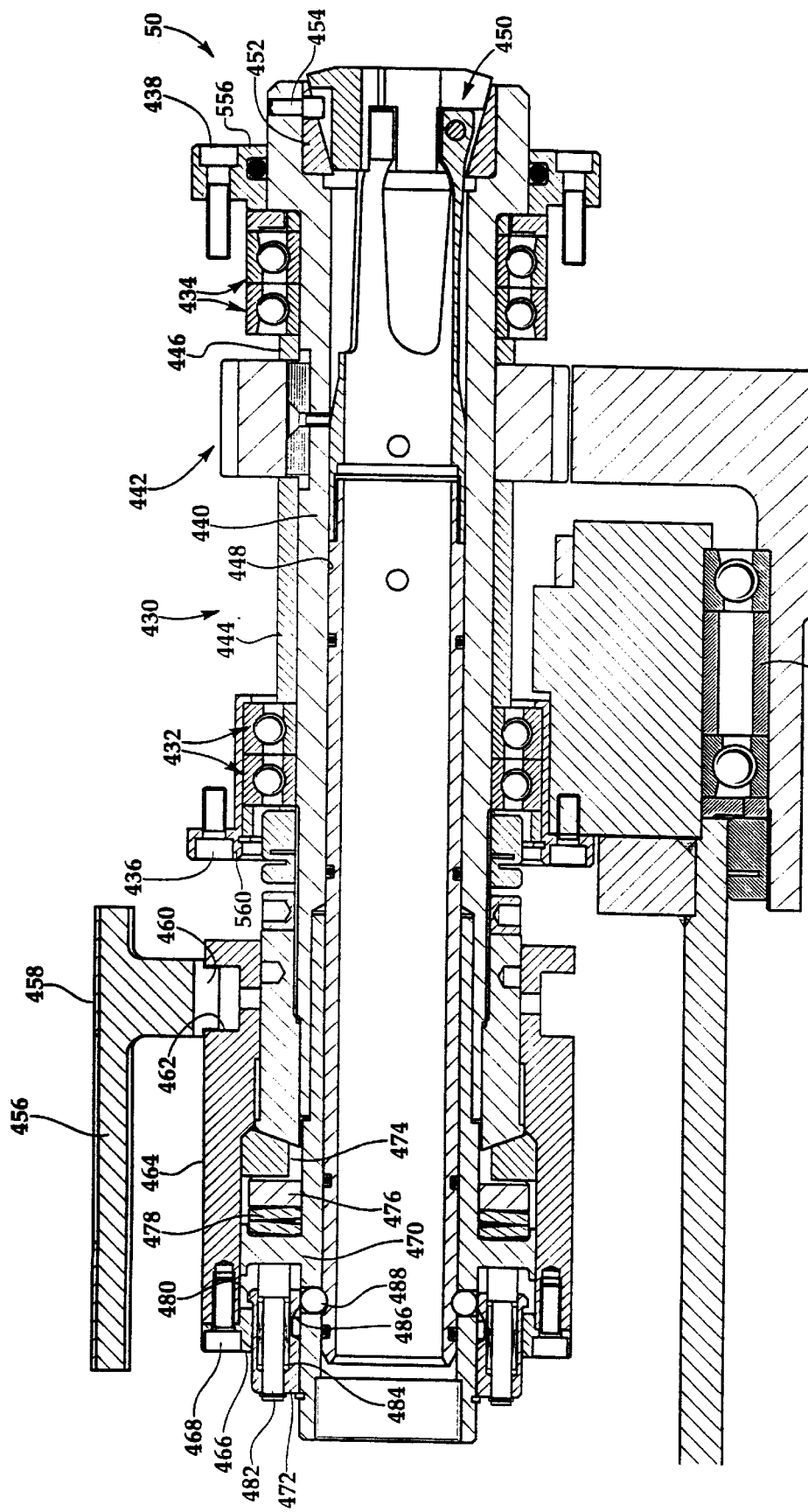
FIG. 21 is view similar to FIG. 20 showing the component parts of the spindle in a second orientation.
Figure 22:
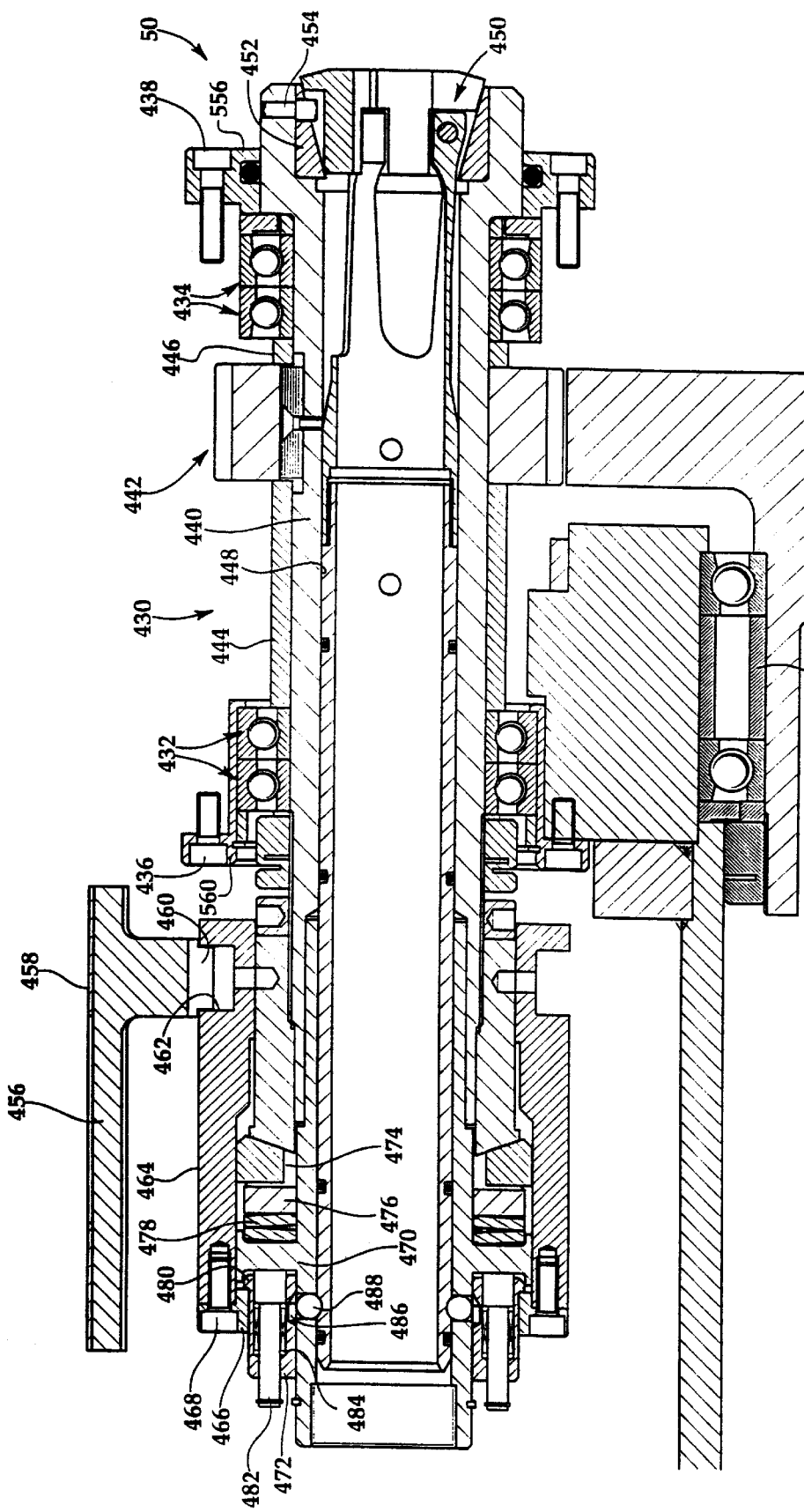
FIG. 22 is an illustration similar to FIG. 20 showing the component parts thereof in a third orientation.

The multi-spindle CNC lathe 50 of the present invention further includes a plurality of spindles 430 of the type illustrated in FIGS. 20, 21, and 22. Each spindle 430 is rotatably supported in the spindle carrier 218 of FIG. 4 by bearings 432 and 434 and is retained therein by threaded fasteners 436 and 438.

Each spindle 430 comprises a main body portion 440 having a planet gear 442 mounted thereon. Spacers 444 and 446 are interposed between the planet gear 442 and bearings 432 and 434 respectively. A collet receiving bore 448 extends through the main body 440 and a conventional self-opening collet 450 is disposed therein. A conventional collet aligning mechanism 452 may be positioned at the collet receiving end of the bore 448. A driving key 454 assures proper alignment between the collet and the spindle.

The spindles 430 of the present invention comprise a unique collet opening, collet closing, and collet releasing mechanism. A glut 456 is slidably supported on a glut guide 458 and includes a dog 460 which engages a slot 462 formed in a collet actuator 464 mounted on the spindle 430. The collet actuator 464 includes a retainer 466 which is secured by threaded fasteners 468. A spring actuating member 470 is slidably supported within the main body 440 of the spindle 430. A spring actuated retainer 472 is slidably supported on the spring actuator 470.

The collet locked position' is illustrated in FIG. 20. At this point the glut 456 has been actuated to position the collet actuator 464 at its extreme rearward position relative to the collet 450. A series of wedges 474 have been forced downwardly. This action moves a slider 476 rearwardly compressing compensating washers 478, whereby a length of stock to be worked (not shown) is securely retained in the collet 450. A dog 480 on the spring actuated retainer 472 is disengaged from the spring retainer 466 whereby a plunger 482 is fully extended under the action of a spring 484.

In FIG. 21 the glut 456 is actuated to move the collet actuator 464 toward the planet gear 442. The wedges 474 move upwardly under the action of the compensating washers 478 and centrifugal force. The retainer 466 approaches but does not quite engage the dog 480, whereby the plunger 482 remains in position. At this point the self-opening collet 450 is released sufficiently to permit the repositioning of stock extending therethrough and/or to receive a new length of stock having the same dimensions as the previously engaged stock.

In FIG. 22 the glut 456 is actuated to move the collet actuator 464 to its extreme position. At this point the spring 484 is substantially compressed due to actuation of the plunger 482 by the spring actuating member 470 and the engagement of the dog 480 with the retainer 466. This aligns a detent 486 with a retaining ball 488 to allow the ball 488 to move upwardly, thereby permitting the removal of the collet 450.

Figure 23:
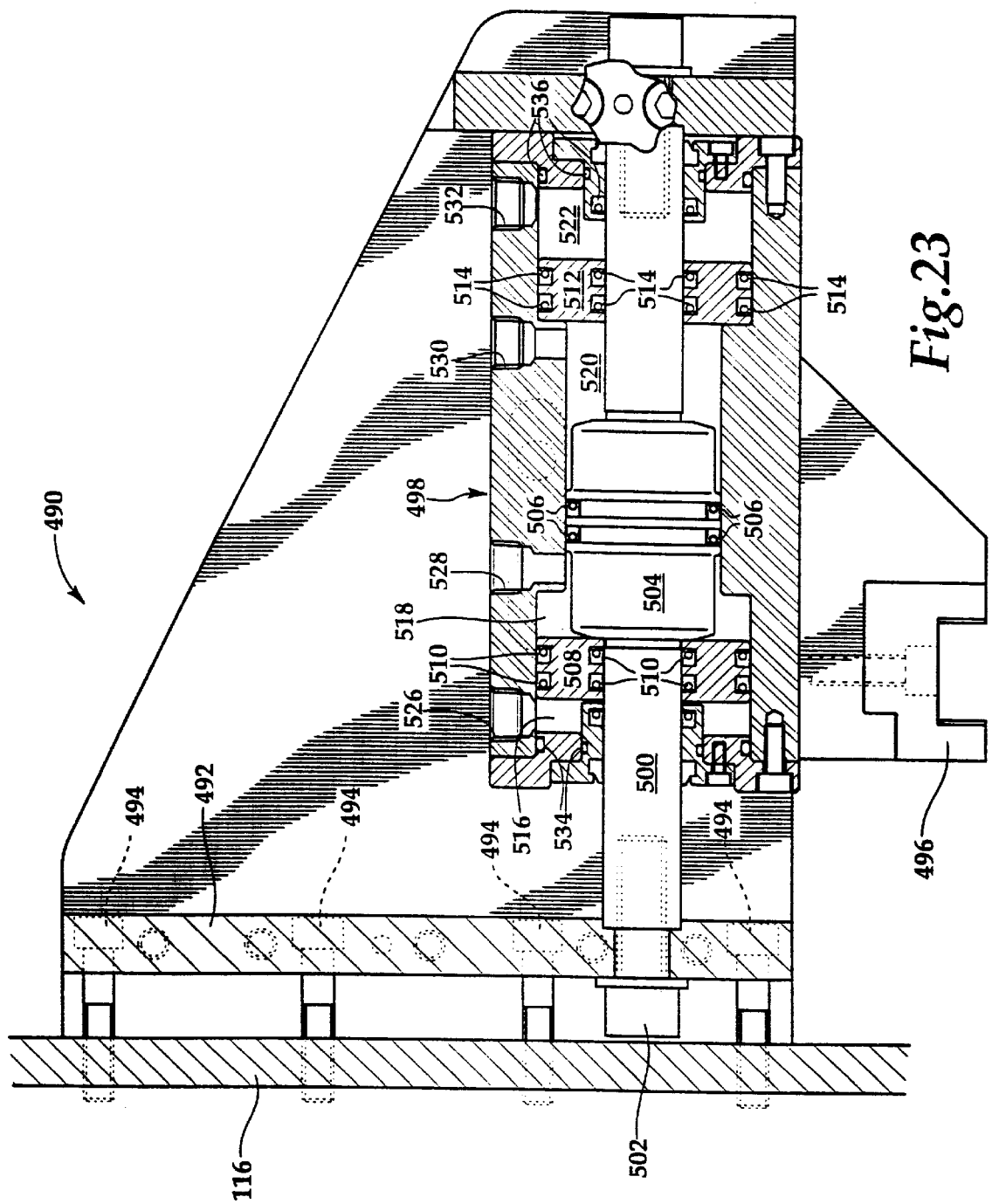
FIG. 23 is a sectional view illustrating the glut actuator of the multi-spindle CNC lathe of the present invention.

Collet removal is indicated when a different size or type of stock is- to be retained by the collet 450 for rotation by the spindle 430. Removal of the collet 450 may be effected either manually or automatically through the use of conventional collet removal and replacement apparatus. FIG. 23 illustrates a glut actuator 490 useful in the practice of the present invention to operate the dog 460 shown in FIG. 20. The glut actuator 490 is mounted on the wall 116 of the casting 108 and is supported thereon by a mounting plate 492 which is secured to the wall 116 by a plurality of threaded fasteners 494. A glut actuator 496 is secured to a movable housing 498 which is slidably supported on a guide rod 500. The guide rod 500 is secured to the mounting plate 492 by a threaded fastener 502. A piston 504 is fixedly mounted on the guide rod 500, and is provided with seals 506. An inner piston 508 is slidably supported on the guide rod 500 and is provided with seals 510. An outer piston 512 is likewise slidably supported on the guide rod 500 and is provided with seals 514.

The pistons 504, 508, and 512 divide the housing 498 into four chambers 516, 518, 520, and 522. Hydraulic fluid inlet and outlet ports 526, 528, 530, and 532 extend to the chambers 516, 518, 520 and 522, respectively. Chamber 516 is secured against leakage by seals 534, and chamber 522 is secured against leakage by seals 536.

It will thus be understood by those skilled in the art that by selectively admitting pressurized hydraulic fluid to one of the chambers 516, 518, 520, and 522, and by simultaneously draining hydraulic fluid from the remaining chambers, the housing 498 and therefore the glut actuator 496 may be selectively located in any of four positions relative to the guide rod 500 and the chamber 516. In this manner the glut actuator 490 of FIG. 23 functions to position the dog 460 of FIG. 20, thereby selectively engaging, disengaging, or releasing the collets 450 of the multi-spindle CNC lathe 50 of the present invention. The fourth position of the glut actuator 490 is used to allow indexing of the spindle carrier 218.

Referring to FIG. 19, the multi-spindle CNC lathe 50 is shown as having eight gluts 456, eight glut guides 458, eight dogs 460, and eight glut actuators 490. This is to demonstrate the use of such components at any of the work stations and in as many No.s as needed for the particular application of the invention. Usually, no more than two gluts and glut actuators will be needed.

Figure 24:
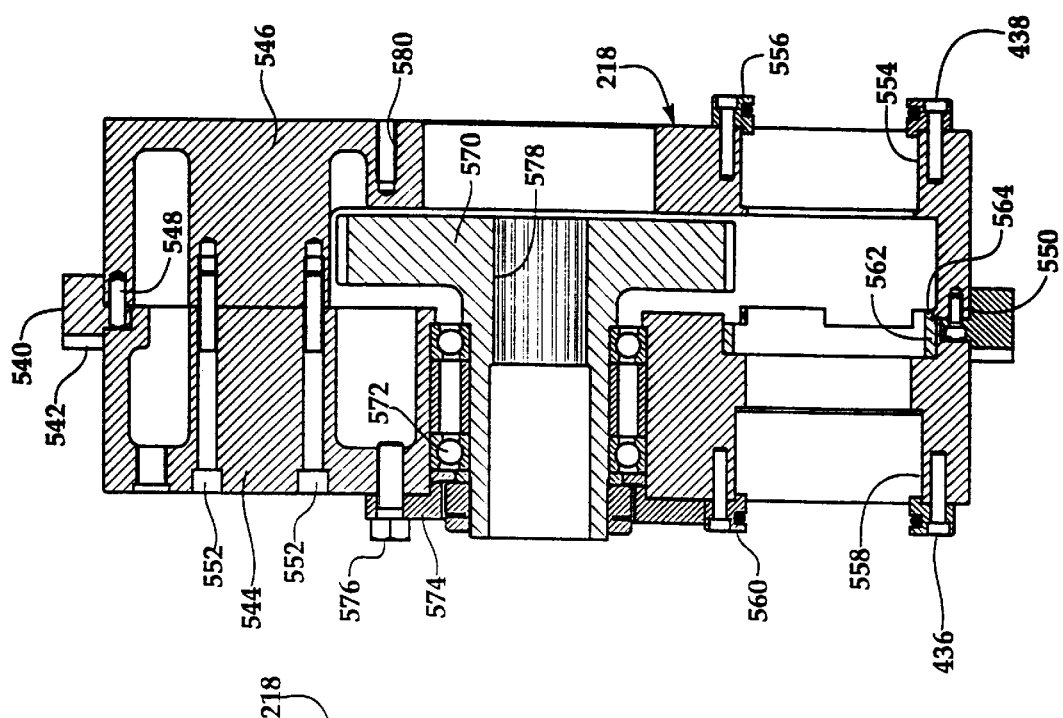
FIG. 24 is a sectional view taken along the line 24—24 of FIG. 25 and illustrating the spindle carrier of the multi-spindle CNC lathe of the present invention.
Figure 25:
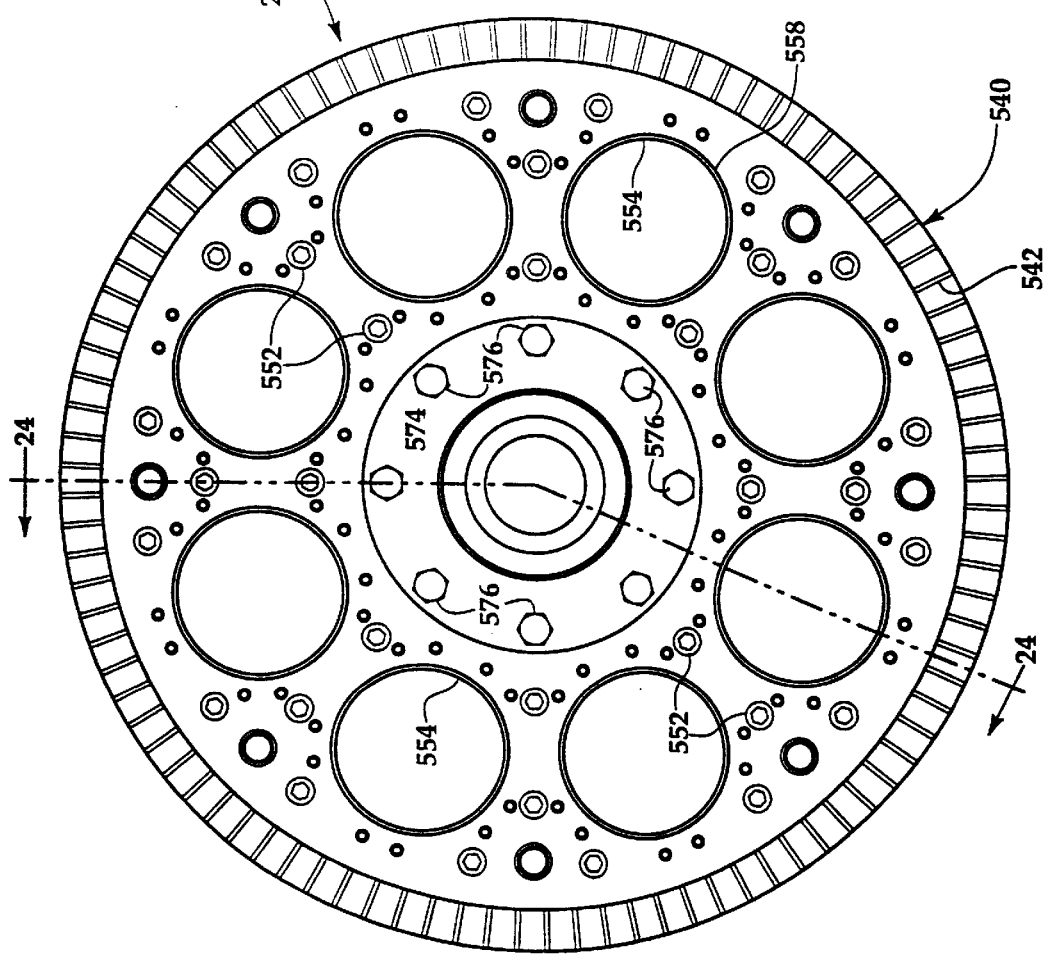
FIG. 25 is an end view of the spindle carrier of the multi-spindle CNC lathe of the present invention.

The spindle carrier 218 of FIG. 4 is further illustrated in the FIG. 24. Multi-toothed coupling portion 540 having teeth 542 formed at equally spaced intervals therearound is secured between opposed body portions 544 and 546. Coupling portion 540 is aligned by means of a dowel 548 and is secured in place by means of threaded fasteners 550. The body portions 544 and 546 are in turn secured together by threaded fasteners 552.

The spindle supporting bearings 434 illustrated in FIGS. 20, 21, and 22 are received in a bearing receiving cavity 554 formed in body member 546. The bearings 434 are secured in place by a plate 556 which is retained by the threaded fasteners 438. The bearings 432 as illustrated in FIGS. 20, 21, and 22 are received in a bearing receiving cavity 558 formed in the body member 544. The bearings 432 are secured by a plate 560 which is secured in place by the threaded fasteners 436.

Referring again to FIG. 24, the body portions 544 and 546 are preferably secured in place prior to the machining of the bearing receiving cavities 554 and 558, thereby assuring precise alignment between the cavities. It will be appreciated that it is occasionally necessary to disassemble the body portions 544 and 546. To this end there is provided an alignment ring 562 having extended profile portions 564. The profile portions comprise segments of approximately 60 degrees which are in turn separated by vacant segments of approximately 60 degrees. By means of the profile portions 564 of the alignment ring 562, the body portions 544 and 546 of the spindle carrier 218 may be separated and reassembled without loss of alignment between the bearing receiving cavities 554 and 558.

A sun gear 570 is rotatably supported within the spindle carrier 218. The sun gear 570 is rotatably supported by bearings 572 which are retained by a plate 574. The plate 574 is in turn retained by threaded fasteners 576.

The sun gear 570 has an internal spline 578 which engages in the internal spline 579 of the drive shaft 166 in FIG. 4. In this manner the sun gear is rotated under the action of the spindle drive motor 154. The sun gear 570 engages the planet gears 442 of the spindles 430, whereby the motor 154 functions to rotate the spindles at a predetermined speed.

The spindle carrier 218 is secured to the tubular ram 182 by means of the threaded fasteners 210 which engage complementary threaded apertures 580 formed in the body portion 546. Thus, upon actuation of the piston 180, the positioning of the spindle carrier 218 is shifted longitudinally relative to the frame 104.

Referring to FIG. 26, the casting 108 comprising the frame 104 has a multi-toothed coupling portion 582 secured therein by threaded fasteners 586. The coupling portion 582 comprises a plurality of teeth 588 which are inverse to the teeth 542 of the coupling portion 540 of the spindle carrier 218. Thus, when the piston 180 is actuated to move the ram 182 toward the casting 108, the teeth 542 of the spindle carrier 218 engage the teeth 588 of the coupling portion 582 on the casting 108 to secure the spindle carrier 218 against rotation relative to the frame 104 of the multi-spindle CNC lathe 50. Conversely, when the piston 180 is actuated to move the ram 182 away from the casting 108, the teeth 542 on the spindle carrier 218 are disengaged from the teeth 588 of the coupling portion 582 on the casting 108, whereupon the spindle carrier 218 is adapted for indexing relative to the frame 104 of the lathe 50.

The frame 104 is provided with a bearing member 590. The bearing member 590 has a precisely machined internal surface 592 which rotatably supports the spindle carrier 218 for indexing. To this end the lower segment of the bearing surface 216 is provided with a layer of polytetrafluroethylene 594 to facilitate rotation of the spindle carrier 218 relative to the bearing member 590

The multi-spindle CNC lathe 50 is provided with a plurality of stock carrier assemblies 600 which are best illustrated in FIGS. 27 and 28. Each stock carrier assembly 600 includes an inner stock carrying tube 602 which extends through one of the spindles 430 and is supported therein for rotation with the collet 450 received in and rotated by the spindle 430. Each tube 602 is secured to a nut 604 which is threadedly engaged with the spindle 430, thereby securing the tube 602 for rotation with the collet 450. The use of a stock carrying tube adapted for rotation with the stock received therein comprises an important feature of the present invention and is a significant departure from the prior art.

Throughout a significant portion of its length the tube 602 extends through a stationary tube 606. The tube 606 is provided with a conventional closure 608 located at the end thereof remote from the spindle 430. The particular closure 608 illustrated in FIG. 27 is of the bayonet variety and is provided with a handle 610 which is moved inwardly to release the closure 608 for the insertion of stock into and through the tubes 606 and 602. At all other times the closure 608 remains positioned as shown in FIG. 27 to seal the interior of the tube 606 against leakage of coolant therefrom.

The rotating tube 602 has a plurality of apertures 612 formed therein to permit the flow of coolant out the tube 602 into the tube 606. The tube 606 extends to a seal 614 which prevents leakage of coolant from the end of the tube 606 remote from the closure 608. A secondary seal 616 is mounted on the seal 614 and extends along the tube 602 further to prevent leakage of coolant.

Each tube 606 is further provided with fixtures 618 and 620 which function to admit coolant into the tube 606. Whenever it is desired to advance the position of the stock located within and rotating with the tube 602, the pressure of the coolant within the tube 606 is increased. It will be understood that one end of the stock is situated within the assembly comprising the tubes 602 and 606, and is therefore subject to the application of an endwise force resulting from the increase in coolant pressure. However, the opposite end of the stock is situated within the collet and is therefore not subject to the increased pressure of the coolant within the tubes 602 and 606. By this means there is provided an endwise force on the stock which pushes the stock through the collet 450 without requiring the use of independent stock advancing mechanisms. The presence of the coolant within the tubes 602 and 606 also provides significant vibration damping and noise reduction as compared with prior art stock advancing mechanisms.

The stock carriage mechanism of the multi-spindle CNC lathe 50 is illustrated in FIG. 29. The stock carriage tubes 602 and 606 of the stock carriage assembly 600 are supported on a carriage assembly 622. Rings 624 are provided at each end of a stock carriage housing 626. Rollers 628 are provided on the carriage assembly 622 and engage the rings 624. By this means the carriage assembly 622 and therefore the stock carriage assembly 600 is adapted for revolution about the central axis 632 of the multi-spindle CNC lathe 50.

Figure 30:
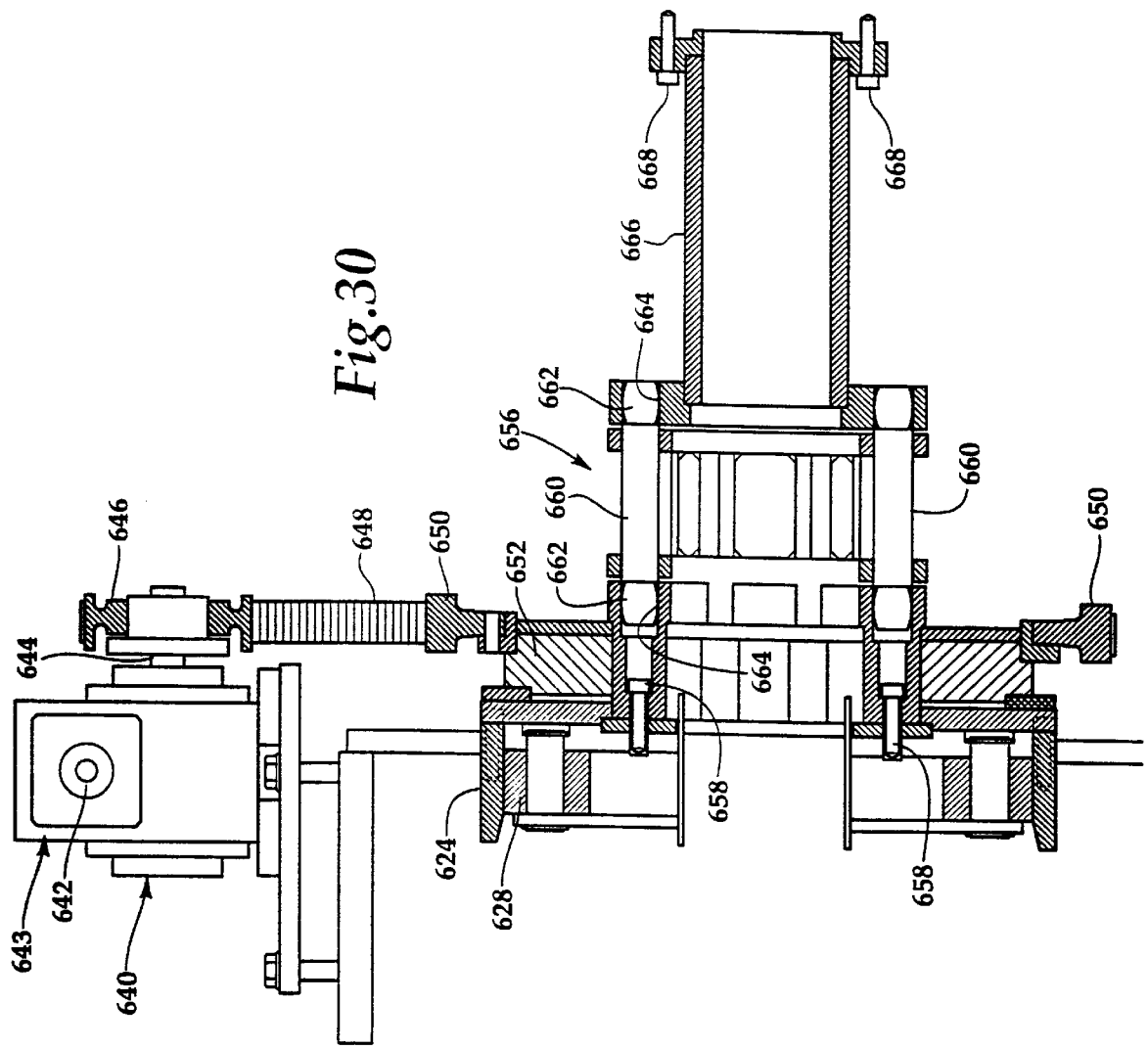
FIG. 30 is a partial sectional view illustrating the indexing mechanism of the multi-spindle CNC lathe of the present invention.

An indexing mechanism 640 for the multi-spindle CNC lathe 50 is illustrated in FIG. 30. A motor 642 drives an indexer 643 which has an output 644 that drives a drive pulley 646. A belt 648 extends around the drive pulley 646 and functions to actuate a driven pulley 650 under the action of the motor 642 and the indexer 643. The driven pulley 650 is connected to a rotator plate 652 which is connected to the carriage assembly 622 by a plurality of threaded fasteners 658. Thus, upon actuation of the motor 642 and indexer 643, the carriage assembly 622 and the stock carriage tubes mounted thereon are revolved around the axis 632.

A spider 656 is mounted to the assembly 622 for rotation therewith under the action of the motor 642 and the indexer 643. The spider 656 comprises a plurality of pins 660 each having opposed spherical ends 662. The spherical ends 662 of the pins 660 are received in bores 664, thereby accommodating a predetermined amount of misalignment between the assembly 622 and a connector 666 which is secured to the spindle carrier 218 by means of a In the operation of the multi-spindle CNC lathe 50, one or more of the closures 608 is disengaged to permit the insertion of stock into the tube 606 and the tube 602 of the stock carrier assembly. The glut actuator assembly 490 is then actuated to operate the dog 460 to open one or more of the collets 450. Stock is initially positioned manually. Thereafter, pressure of the coolant within the tubes 602 and 606 of the stock carrier assembly is selectively increased, whereupon the stock is advanced through the corresponding collet 450 until it is properly positioned.

Indexing of the stock relative to the tools of the multi-spindle CNC lathe 50 begins with actuation of the piston 180 to move the ram 182 rightwardly (FIG. 5) thereby disengaging the teeth 542 of the coupling portion 540 of the stock carrier 218 (FIG. 24) from the teeth 588 of the coupling portion 582 which is secured to the frame 104 (FIG. 26). The indexing motor 642 (FIG. 30) is then actuated to index the carriage assembly 622 and therefore the tubes 602 and 606, and also the stock carrier 218 having the spindles 430 and the collets 450 mounted thereon. This action causes the stock, the tube 602 and 606, the spindles 430, and the collets 450 to revolve about the axis 632 of the multi-spindle CNC lathe 50 until the stock is properly positioned relative to the frame.

The internal slide assemblies 220 of the multi-spindle CNC lathe 50 are mounted on the support body 308 which is secured to the wall 112 of the casting 106 of the frame 104. Therefore, as the stock is indexed under the action of the motor 642, the internal slide assemblies do not move, but instead remain stationary and in position to engage the next individual piece of stock which is aligned therewith.

Likewise, the external slide assemblies 330 are supported on support brackets 332 which are secured to the wall 114 of the casting 108 of the frame 104 by threaded fasteners 334. Therefore, the external slide assemblies 330 do not move as the stock is indexed under the action of the motor 642, but instead remain positioned for engagement with the next piece of stock which is aligned therewith.

An important feature of the present invention comprises the fact that the external slide assemblies 330 are adapted to move the tools 336 not only toward and away from, that is, perpendicular to the rotating stock, but also along the length of, that is parallel to the stock. The tools 336 do not comprise forming tools, but instead comprise general purpose metal working tools which may be utilized to form any desired shape in the external surfaces of the stock pieces. It is therefore not necessary to remove and replace the tools 336 when adapting the multispindle CNC lathe 50 of the present invention to the manufacture of a different product.

This in turn means that the multi-spindle CNC lathe 50 of the present invention is readily adapted to the Just In Time, or JIT, manufacturing philosophy in that the lathe 50 may be utilized to manufacture a small number of parts and to have the parts available at the precise moment that they are needed in subsequent manufacturing operations. The multi-spindle CNC lathe 50 of the present invention is also readily adapted to the Statistical Process Control, or SPC, manufacturing philosophy whereby wearing of the tools utilized in the internal slide assemblies 220 and the external slide assemblies 330 is constantly monitored and adjusted by actuating the slide assemblies 220 and 330 to assure manufacturing tolerances which are well within the acceptable range.

After all of the tools comprising the internal slide assemblies 220 and all of the tools comprising the external slide assembly 330 have completed their respective functions, the tools are disengaged from the rotating stock. At this point the piston 180 is actuated to disengage the teeth 542 of the stock carrier 218 from the teeth 588, whereupon the motor 642 is actuated to index the stock into alignment with the next successive work station. As will be understood by those skilled in the art, one or more of the spindles comprising the multi-spindle CNC lathe 50 comprises a cutoff station, wherein the finished work is disengaged from the stock. Upon cutoff, the stock is selectively advanced through the respective collets under the action of increased pressure in the coolant in the associated tubes 602 and 606.

All of the component parts of the multi-spindle CNC lathe operate under the control of the CNC system 56. In this manner there is facilitated the use of general purpose cutting tools, rather than forming tools, which in turn facilitates the JIT manufacturing philosophy. Likewise, the CNC system facilitates the SPC manufacturing philosophy by constantly repositioning the cutting tools to accommodate wear.

Those skilled in the art will appreciate the fact that in the operation of the multi-spindle CNC lathe of the present invention, the two servo mechanisms comprising each external slide assembly operate simultaneously in order to form the complex configurations which are typically fabricated on single spindle and multi-spindle legs. Preferably, each internal slide assembly 220 operates simultaneously with its corresponding external slide assembly 330 in order that the multi-spindle CNC lathe 50 can function at maximum efficiency. It will be understood, rearrangements, modifications, and substitutions of parts and elements without departing from the spirit of the invention.

What is claimed is:

1. A method of forming at least two different parts from a single length of bar stock including the steps of:

providing a length of bar stock having an axis;

rotating the length of bar stock about its axis;

providing a forming zone;

selectively advancing the length of bar stock along its axis until a first portion of the length of bar stock is located in the forming zone;

providing a first single point cutting tool;

providing a first CNC controllable mechanism for selectively advancing and retracting the first cutting tool into and out of the forming zone along a path parallel to the axis of the rotating length of bar stock;

providing a second single point cutting tool;

providing a second CNC controllable mechanism for selectively advancing and retracting the second cutting tool into and out of the forming zone along a path extending radially relative to the rotating length of bar stock;

providing a third CNC controllable mechanism for selectively advancing and retracting the second cutting tool along a path parallel to the axis of the rotating bar stock;

providing CNC control means for simultaneously operating the first, second, and third CNC controllable mechanisms;

causing the control means to simultaneously operate the first, second, and third CNC controllable mechanisms to advance and retract the first and second cutting tools in accordance with a first predetermined sequence of instructions to form the first portion of the length of bar stock into a first predetermined configuration;

thereafter advancing the length of bar stock along its axis until a second portion of the length of bar stock is positioned in the forming zone;

immediately thereafter causing the control means to simultaneously operate the first, second and third CNC controllable mechanisms to advance and retract the first and second cutting tools in accordance with a second predetermined sequence of instructions to form the second portion of the length of bar stock into a second predetermined configuration which is substantially different from the first predetermined configuration.

* * * * *

UNITED STATES PATENT AND TRADEMARK OFFICE
CERTIFICATE OF CORRECTION

| | |
|---|---|
| PATENT NO. | : 6,305,257 B2 |
| APPLICATION NO. | : 09/848477 |
| DATED | : October 23, 2001 |
| INVENTOR(S) | : John G. Crudgington et al. |

It is certified that error appears in the above-identified patent and that said Letters Patent is hereby corrected as shown below:

Col. 1, line 27, replace "finishing machines," with --finishing machines, and more complex devices such as screw machines,--.

Col. 1, line 28, replace "the manufacture of" with --the manufacture of large numbers of identical finished parts under conditions of--.

Col. 2, line 12, replace "exact No." with --exact number--.

Col. 2, line 30, replace "center of the tolerance" with --center of the tolerance range, due to cutting tool wear or otherwise, adjustments in the manufacturing process are immediately instituted in order to maintain tolerances. SPC is easily practiced in the machine tool of the present invention since all of the cutting tools are positioned by servo mechanisms which are in turn under computer numeric control.--.

Col. 3, line 42, replace "the-present" with --the present--.

Col. 4, line 46, replace "at' one end" with --at one end--.

Col. 5, line 8, replace "The-walls" with --The walls--.

Col. 5, line 36, replace "mounting block 142" with --mounting block 142'--.

Col. 6, line 4, replace "164 in turn-" with --164 in turn--.

Col. 6, line 13, replace "which is located" with --which is located relative to the wall 112 of the casting 106 by a hardened precision dowel pin 186 and is secured to the wall 112 by a plurality of threaded fasteners 188. A first hydraulic fluid chamber 190 is defined at one end of the piston 180 and is isolated by a plurality of seals 192. The chamber 190 is closed by an end plate 194 which is secured to the cylinder 184 by a plurality of threaded fasteners 196. The end plate 194 is provided with a hydraulic fluid inlet and outlet port 198.

A second hydraulic fluid chamber 200 is located at the opposite end of the piston 180 and is isolated by a plurality of seals 202. The chamber 200 is provided with a hydraulic fluid inlet and outlet port 204 formed in the cylinder 184. Thus, upon selective application of hydraulic pressure to one of the chambers 190 or 200 and the simultaneous release of hydraulic pressure from the opposite chamber, the piston 180 and the tubular ram 182 are caused to move longitudinally relative to the cylinder 184.

UNITED STATES PATENT AND TRADEMARK OFFICE
CERTIFICATE OF CORRECTION

| | | |
|---|---|---|
| PATENT NO. | : 6,305,257 B2 | |
| APPLICATION NO. | : 09/848477 | |
| DATED | : October 23, 2001 | |
| INVENTOR(S) | : John G. Crudgington et al. | |

It is certified that error appears in the above-identified patent and that said Letters Patent is hereby corrected as shown below:

The end of the tubular ram 182 remote from the piston 180 is provided with a flange 206. A retaining ring 208 engages the flange 206, and a plurality of threaded fasteners 210 secure the retaining ring to an adapter 212. The adapter 212 supports a bearing 216 which rotatably supports the shaft 166. The threaded fasteners 210 and--.

Col. 6, line 16, replace "working-components" with --working components--.

Col. 7, line 48, replace "drive-pulley 712" with --drive pulley 712--.

Col. 9, line 4, replace "340. is supported" with --340 is supported--.

Col. 9, line 9, replace "system 54 which is turn" with --system 56 which is turn--.

Col. 10, line 14, replace "locked position' is" with --locked position is--.

Col. 10, line 44, replace "of stock is- to" with --of stock is to--.

Col. 11, line 17, replace "as many No.s as" with --as many numbers as--.

Col. 12, line 23, replace "bearing member 590" with --bearing member 590.--.

Col. 13, line 33, replace "by means of a" with --by means of a plurality of threaded fasteners 668. Thus, upon actuation the motor 642 functions not only to rotate the assembly 622 but also to rotate the spindle carrier assembly 218 simultaneously therewith.--

Col. 14, line 15, replace "multispindle" with --multi-spindle--.

Col. 14, line 62, replace "understood, rearrangements," with --understood, however, that a particular internal slide assembly 220 and its corresponding external slide assembly 330 can operate sequentially depending upon the requirements of particular applications of the invention.

UNITED STATES PATENT AND TRADEMARK OFFICE
CERTIFICATE OF CORRECTION

| | | |
|---|---|---|
| PATENT NO. | : 6,305,257 B2 | Page 3 of 3 |
| APPLICATION NO. | : 09/848477 | |
| DATED | : October 23, 2001 | |
| INVENTOR(S) | : John G. Crudgington et al. | |

Figure 34:
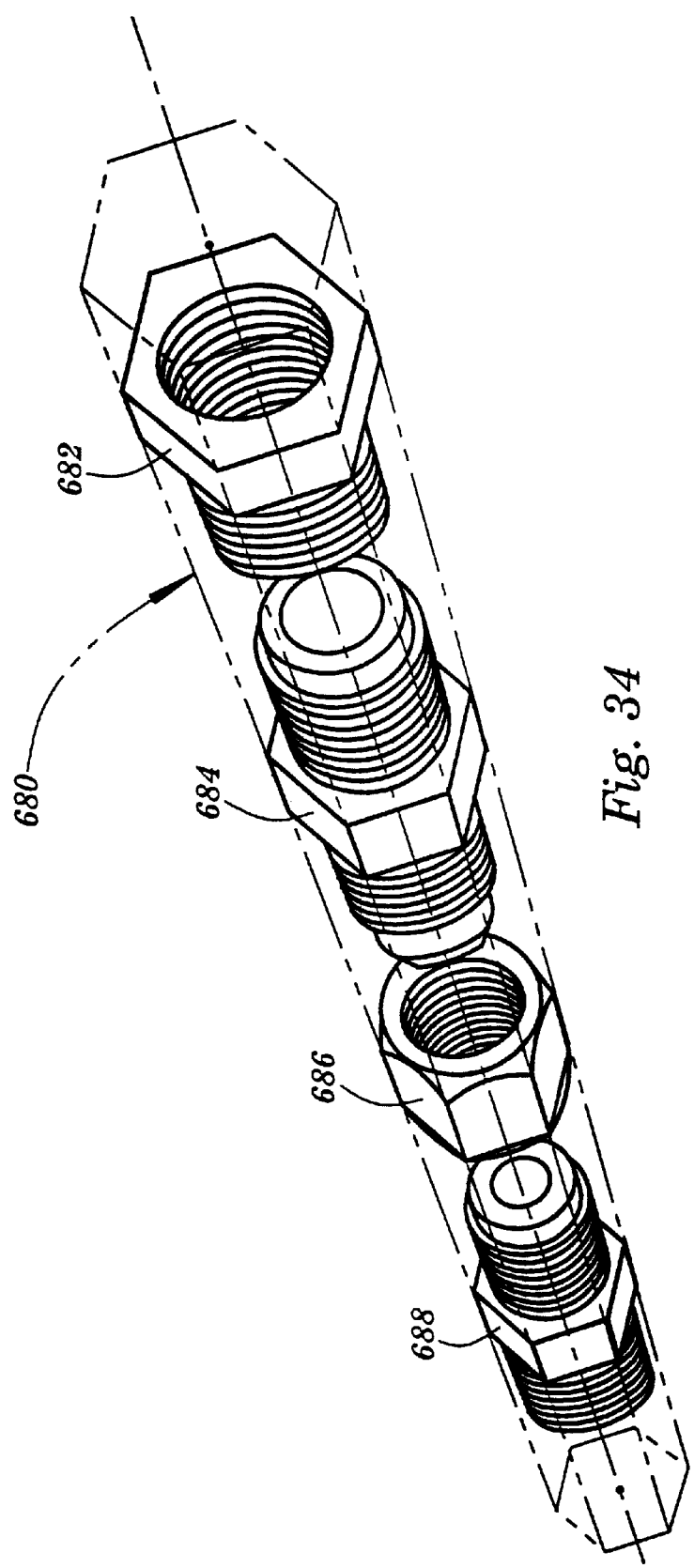
FIG. 34 is a perspective view illustrating the operation of the multi-spindle CNC lathe of the present invention.
Figure 35:
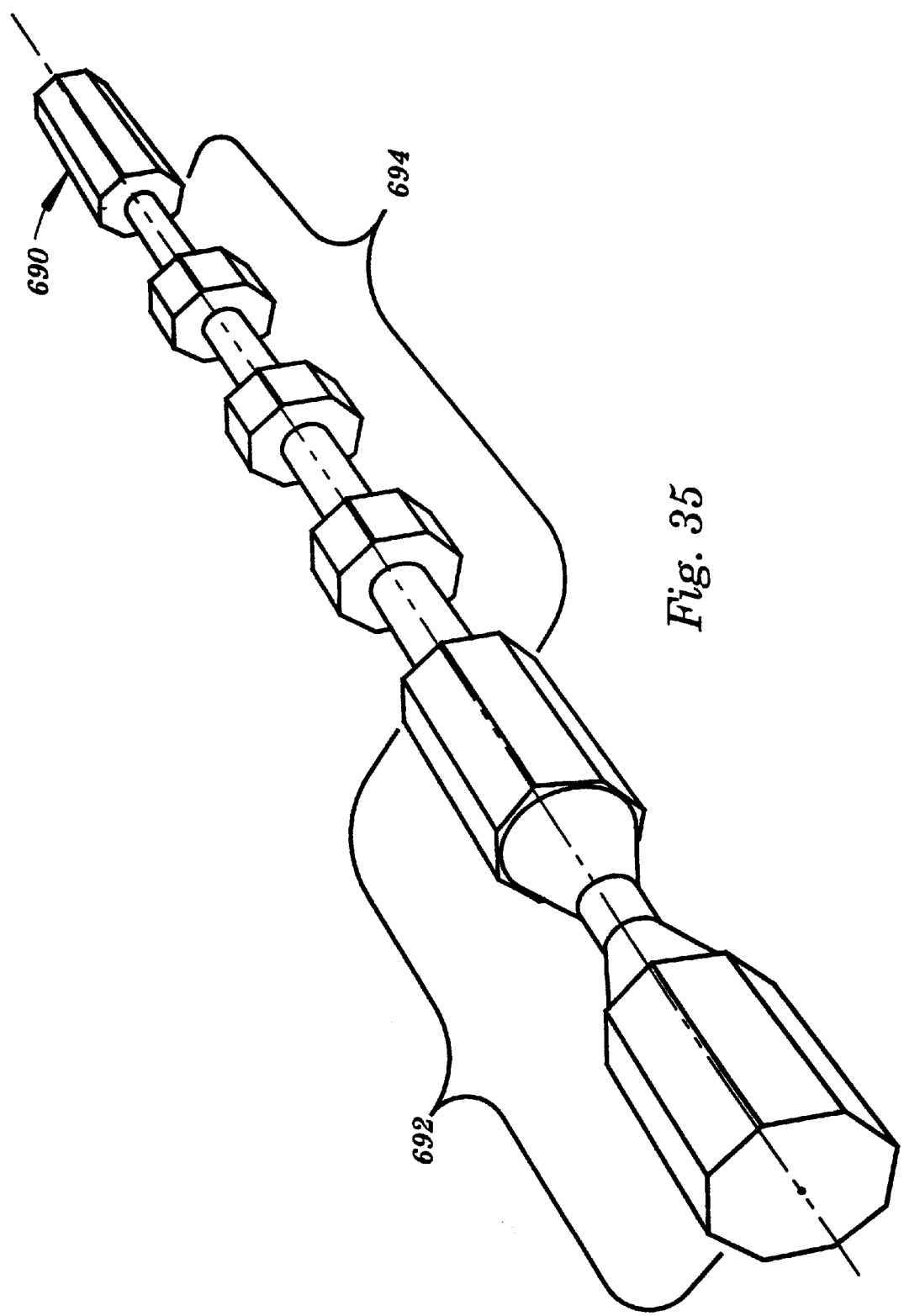
FIG. 35 is a perspective view further illustrating the operation of the multi-spindle CNC lathe of the present invention.

It is certified that error appears in the above-identified patent and that said Letters Patent is hereby corrected as shown below:

Referring to FIGURE 34, there is shown a length of bar stock 680 which is sequentially formed into four entirely different piece parts 682, 684, 686, and 688 utilizing the multi-spindle CNC lathe of the present invention. The piece parts 682, 684, 686, and 688 are formed at the same work station with the fabrication of the piece part 684 beginning immediately after the completion of the piece part 682, etc. and without the necessity of changing cutting tools or changing the set up of the multi-spindle CNC lathe 50. Referring to FIGURE 35, a length of octagonal bar stock 690 is fabricated into entirely different piece parts 692 and 694. Again, the manufacture of the piece part 694 begins immediately upon the completion of the piece part 692 without changing cutting tools and without changing the set up of the multi-spindle CNC lathe 50.

Although preferred embodiments of the invention have been illustrated in the accompanying Drawings and described in the foregoing Detailed Description, it will be understood that the invention is not limited to the embodiments disclosed but is capable of numerous rearrangements,--.

Signed and Sealed this

Nineteenth Day of February, 2008

JON W. DUDAS
*Director of the United States Patent and Trademark Office*